US011354659B1

(12) United States Patent
Krueger et al.

(10) Patent No.: US 11,354,659 B1
(45) Date of Patent: Jun. 7, 2022

(54) SECURING TRANSACTION MESSAGES BASED ON A DYNAMIC KEY SELECTION

(71) Applicant: Amazon Technologies, Inc., Seattle, WA (US)

(72) Inventors: Chelsea Celest Krueger, Seattle, WA (US); Guy Bialostocki, Seattle, WA (US); Amitpal Singh Bhutani, Bellevue, WA (US); Justin Michael Bonnar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1266 days.

(21) Appl. No.: 15/383,345

(22) Filed: Dec. 19, 2016

(51) Int. Cl.
*G06Q 20/38* (2012.01)
*G06Q 20/20* (2012.01)

(52) U.S. Cl.
CPC ....... *G06Q 20/3829* (2013.01); *G06Q 20/204* (2013.01)

(58) Field of Classification Search
CPC .................................................. G06Q 20/3829
See application file for complete search history.

(56) References Cited

U.S. PATENT DOCUMENTS

| | | | | |
|---|---|---|---|---|
| 7,710,286 B1 * | 5/2010 | Thornley | ............... | H01L 23/576 340/657 |
| 2003/0169881 A1 * | 9/2003 | Niedermeyer | ......... | G06Q 20/04 380/258 |
| 2004/0105121 A1 * | 6/2004 | Taniguchi | ............... | H04L 51/30 358/1.15 |
| 2004/0225889 A1 * | 11/2004 | Wuidart | ............. | G06Q 20/4097 713/193 |
| 2005/0203892 A1 * | 9/2005 | Wesley | ............... | G06F 21/6227 |
| 2006/0049255 A1 * | 3/2006 | von Mueller | ........... | G06F 21/72 235/449 |
| 2006/0242411 A1 * | 10/2006 | Lin | ..................... | H04L 63/0823 713/171 |
| 2006/0282372 A1 * | 12/2006 | Endres | .................. | G07F 7/1008 705/38 |
| 2007/0214209 A1 | 9/2007 | Maeda | | |

(Continued)

OTHER PUBLICATIONS

Chelsea Celest Krueger, et al., U.S. Appl. No. 15/383,385, U.S. Patent Application, filed Dec. 19, 2016, Titled: Multi-path Back-End System for Payment Processing.

*Primary Examiner* — Steven S Kim
(74) *Attorney, Agent, or Firm* — Kilpatrick Townsend & Stockton LLP

(57) ABSTRACT

Systems and methods for securing transaction messages are described. In an example, a rule set may be accessed. The rule set may specify a selection of a key from a plurality of keys or an obfuscation process from a plurality of obfuscation processes. The selection may be based on a condition associated with securing transaction messages. The keys or the obfuscation processes may be stored at a card reader. An instruction about the selection may be provided to the card reader based on the rule set and a determination that the condition is satisfied. In turn, a secure transaction message may be received from the card reader. The secure transaction message may have been secured based on the key or the obfuscation process. The secure transaction message may be provided to a transaction system that includes a management system associated with the key or the obfuscation process.

20 Claims, 10 Drawing Sheets

(56) References Cited

U.S. PATENT DOCUMENTS

| | | | |
|---|---|---|---|
| 2010/0049658 A1* | 2/2010 | Sanchez | H04L 9/14 705/64 |
| 2010/0057621 A1* | 3/2010 | Faith | G06Q 20/04 705/71 |
| 2010/0299265 A1* | 11/2010 | Walters | H04L 9/3263 705/67 |
| 2011/0071892 A1* | 3/2011 | Dickelman | G06Q 30/0238 705/14.17 |
| 2011/0125566 A1* | 5/2011 | McLaughlin | G06Q 30/0222 705/14.23 |
| 2012/0198266 A1* | 8/2012 | Hofmann | G06F 1/324 713/501 |
| 2012/0265631 A1* | 10/2012 | Cronic | G06Q 20/3674 705/26.1 |
| 2012/0316992 A1 | 12/2012 | Oborne | |
| 2013/0080327 A1 | 3/2013 | Baldrick et al. | |
| 2013/0132854 A1* | 5/2013 | Raleigh | H04W 4/60 715/738 |
| 2013/0212007 A1* | 8/2013 | Mattsson | G06Q 20/4014 705/39 |
| 2013/0279744 A1* | 10/2013 | Ingrassia, Jr | G06F 21/6209 382/103 |
| 2013/0339116 A1* | 12/2013 | Schwarzkopf | G06Q 40/00 705/14.23 |
| 2014/0217169 A1* | 8/2014 | Lewis | G07F 19/20 235/379 |
| 2014/0310183 A1* | 10/2014 | Weber | G06Q 20/20 705/71 |
| 2015/0006407 A1* | 1/2015 | Lunn | G06Q 20/20 705/73 |
| 2015/0046338 A1 | 2/2015 | Laxminarayanan et al. | |
| 2015/0127552 A1* | 5/2015 | Shoarinejad | G06Q 20/206 705/71 |
| 2015/0324793 A1* | 11/2015 | Guise | G07G 1/14 705/71 |
| 2018/0025353 A1* | 1/2018 | Collinge | G06Q 20/322 705/71 |
| 2019/0132613 A1* | 5/2019 | Jiao | H04N 21/63 |
| 2019/0385142 A1* | 12/2019 | Bell | G06Q 20/29 |

* cited by examiner

SECURING TRANSACTION MESSAGES BASED ON A DYNAMIC KEY SELECTION

BACKGROUND

In a networked computer environment, messages may be secured with an encryption key when exchanged between computers. However, when the encryption key is compromised, the security is affected. Typically, sensitive messages may no longer be exchanged until a new encryption key becomes available. During that time period, the networked computer environment may become unavailable to exchange messages.

Consider the example of a networked computer environment for processing transaction data. This environment may include card readers, a hardware security module, and a processing endpoint. Typically, the card readers store a single encryption key corresponding to an encryption key of the hardware security module. The two encryption keys form a pair (e.g., a key pair in the case of asymmetric encryption). Transactions initiated at the card readers are encrypted based on the single encryption key. Resulting transaction messages are routed to the hardware security module for decryption. Once decrypted, the hardware security module may pass transaction data to the processing endpoint to complete aspects of the transactions.

However, if one of the encryption keys from the pair is compromised, transaction messages may no longer be secured. Hence, the card readers and the hardware security module becomes unusable and may be taken offline. Over a period of time, the card readers and the hardware security module may be replaced with new ones, which is a long, difficult, and cumbersome process. During that period of time, no transactions may be processed through the networked computer environment.

In addition to going offline due to the security compromise, other network-related factors may inhibit the usability of the networked computer environment. No efficient solutions currently exist for dynamically dealing with these factors to improve the usability. For example, if a network latency of the environment increases, the exchange of transaction messages may be delayed and may inhibit applications that rely on real-time message processing. In another example, if there is a network failure (e.g., the hardware security module gets disconnected), the networked computer environment becomes unavailable, thereby inhibiting the message processing.

BRIEF DESCRIPTION OF THE DRAWINGS

Various embodiments in accordance with the present disclosure will be described with reference to the drawings, in which.

DETAILED DESCRIPTION

Figure 1:
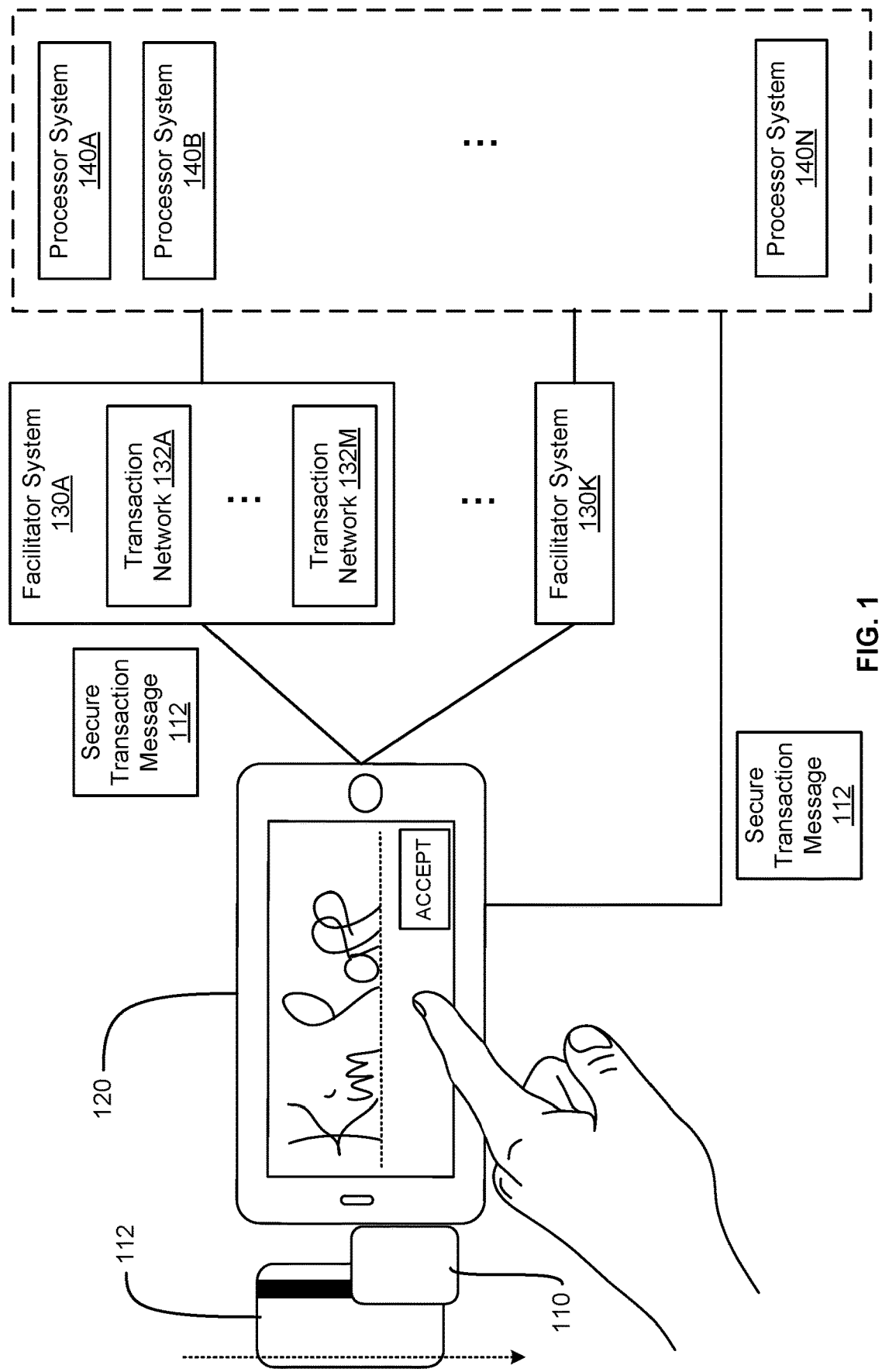
FIG. 1 illustrates an example of a networked computer environment for exchanging and processing transaction messages, according to an embodiment of the present disclosure.

In the following description, various embodiments will be described. For purposes of explanation, specific configurations and details are set forth in order to provide a thorough understanding of the embodiments. However, it will also be apparent to one skilled in the art that well-known features may be omitted or simplified in order to not obscure the embodiment being described.

Embodiments of the present disclosure are directed to, among other things, improving the usability of a networked computer environment while maintaining the security of the message exchange within this environment. In an example, the networked computer environment may be configured to facilitate the exchange and processing of transaction messages. More specifically, the networked computer environment may include card readers, a point of sale system, transaction networks, and processor endpoints. A card reader may store a plurality of keys. Each of the keys may be associated with a specific key management system (e.g., a hardware security module) of a transaction network. The point of sale system may store a rule set that specifies a selection of one of the plurality of keys to secure transaction messages therewith. The selection may be dynamic based on a monitoring of network and transaction related conditions. Each transaction network may be communicatively coupled with the point of sale system and the processor endpoints over one or more data networks. Further, each transaction network may include a key management system associated with one of the plurality of keys. The associations between the keys stored at a card reader and the keys of the various key management systems may be a one-to-one association, where each of the stored keys may correspond to one and only one key of the key management systems. Nonetheless, copies of the keys may be stored across the different card readers. Given a real-time condition, the point of sale system may select a particular key based on the rule set. The selected key may correspond to a particular key management system of a particular transaction network. Transaction messages corresponding to transactions initiated at the card readers may be secured (e.g., encrypted) based on the selected key. The point of sale system may provide the secure transaction messages to the particular transaction network. The key management system may process the secure transaction messages and generate transaction data.

The transaction data may then be provided to one or more of the processor endpoints to complete aspects of the transactions.

To illustrate, consider the simplified example of a network computer environment that includes a card reader, a point of sale device, a first transaction network having a first key management system, a second transaction network having a second key management system, and a single clearing house. The card reader may store a first encryption key associated with the first key management system and a second encryption key associated with the second key management system. The rule set may specify that the second transaction network should be utilized by default, while the first transaction network should be utilized instead if the second one is unavailable. Upon a determination that no heartbeat was received from the second transaction network, the point of sale device may detect that this default network is offline. Accordingly, the point of sale device may instruct the card reader to switch to the first encryption device for encrypting transaction messages. Upon a swipe of a credit card at the card reader and while the second transaction network is offline, the credit card reader may encrypt the resulting transaction message with the first encryption key instead of the second one. The encrypted message may be passed to the point of sale device, which may in turn pass it to the first transaction network in lieu of the second transaction network. The first key management system may decrypt the encrypted message, extract transaction data, and provide the transaction data to the clearing house.

Usage of multiple keys stored at a card reader, a rule set for dynamically selecting one of the keys (or, equivalently, a transaction network associated with the key), and multiple transaction networks provides technical improvements over existing networked computer environments. For example, redundancy, latency minimization, flexibility, scalability, and/or updatability may be improved in a computer networked environment that implements such features. More specifically, redundancy may be improved because, if one of the transaction networks may become unavailable, the rule set may specify a switch to another transaction network and transactions may be secured based on a key of the other transaction network. The latency may be minimized because the rule set may specify the selection of the transaction network (and the associated key) that may have the lowest network latency among the different networks. The flexibility may also be increased because the selection may be subject to various transaction-related conditions, such as operator preferences, time of day, batch processing, load balancing, and/or other conditions. The scalability may be enhanced because the support of transaction networks may be efficiently added or removed by simply updating the rule set. The updatability may also be improved because, for example, if an existing key is compromised, a new key is added, and/or a key management system is replaced or added, the card readers need not be replaced. Instead, a software update may be pushed to the card readers to add the new key and remove or disable the existing key. These and other technical improvements are further illustrated and become more apparent from the various embodiments of the present disclosure.

In the interest of clarity of explanation, various embodiments of the present disclosure are described in connection with secure a set of transaction messages based on a set of keys. Generally, a key may include an encryption key or a secret. Securing a transaction message based on a key may include encrypting the transaction messages based on such a key. Various encryption algorithms may be available. An encryption process may include a key and an algorithm, both of which may be applied to data of a transaction message. Even when the applied algorithm is known, un-securing the secured transaction message may necessitate the key to reverse or decrypt the secured data in a predetermined amount of time.

However, the embodiments of the present disclosure are not limited to applying an encryption process(es) to secure a set of transaction message(s). Instead, the embodiments may similarly apply to any process for securing data, where the data may be included in a transaction message. For example, the embodiments similarly apply to an obfuscation process. The obfuscation process may include an algorithm that may obscures the data, such as a Polymorphic algorithm. This algorithm may not rely or involve an encryption key or a secret. When applied to the data, the obfuscation process may render the obfuscated data difficult to reverse without knowledge of the algorithm that was applied. In this example, instead of or in addition to storing multiple keys at a point of sale system, such as at a card reader, multiple obfuscation processes may be stored at the point of sale system. Each obfuscation process may be associated with a management system of a transaction network that belongs to a facilitator system or a processor system. The management system may have knowledge of the obfuscation process (e.g., may store an equivalent process for reading and processing the obfuscated data) and may, accordingly, reveal the obfuscated data. When the management system receives a transaction message secured with the obfuscation process, the management system may reveal the secured data of this message based on the equivalent process. Hence, instead of or in addition to a selection of a key, a selection of set of the obfuscation processes may be performed. The obfuscation process selection may be based on a rule set, which may but need not be the same as the rule set used for the key selection. A transaction message may be secured based on a selected obfuscation process (e.g., by applying this process to the data of this message). The secure transaction message may be sent to the proper management system. The management system may, in turn, process and reveal the secured data based on knowledge of the obfuscation process.

Turning to FIG. 1, the figure illustrates an example of a networked computer environment for exchanging and processing transaction messages. As illustrated, the networked computer environment may include a card reader 110, a point of sale system 120, a plurality of facilitator systems 130A-130K, and a plurality of processor systems 140A-140N. Although a single card reader 110 is shown, the networked computer environment may include a plurality of card readers. Each card reader may be communicatively coupled with a point of sale device. The set of point of sale devices may form the point of sale system 120.

Generally, a transaction may be initiated at the card reader 110. The card reader may generate a transaction message for the transaction. The transaction message may be secured based on a key, such as encrypted with an encryption key, resulting in a secure transaction message 112. The secure transaction message 112 may be routed from the point of sale system 120 to one of the processor systems 140A-140N directly or through one of the facilitator systems 130A-130K. An aspect of the transaction (e.g., a charge applied or a refund returned) may be processed and complete based on the secure transaction message 112.

In an example, a read of a user card 112, such as a swipe of a credit card or some other payment instrument, may trigger the transaction. The generated transaction message may include a transaction amount, such as a charge or a refund to the credit card. In addition, the transaction message may include data that identifies the user card 112. Various types of data may be possible alone or in combination. One data type may include data read from the user card 112, such as card identifiers (e.g., credit card number, name on the card, expiration date, a card verification value (CVV) number, or other data read from the user card 112). Another data type may include a token that corresponds to the user card 112. The use of these two data types is further illustrated in the next figures.

The card reader 110 may use various technologies to read the user card 112, such as contact-based and wireless technologies. For example, the card reader 110 may include any or a combination of a magnetic stripe reader, a near field communication (NFC) reader, a keypad, and other types of readers. The card reader 110 may also use various technologies to interface with the point of sale system 120, such as wireless and wired technologies. The interface may occur over a data network or may be carried over a dedicated communication bus. For example, the interface may include an audio, Universal Serial Bus ("USB"), wireless, one or more of radio signal-based data transfer (e.g., NFC or Bluetooth®), light-based data transfer (e.g., infrared data transfer), an acoustic-based data transfer (e.g., sound wave-embedded data), or magnetic field-based transfer, and other interfaces.

Over the interface, data may be exchanged between the card reader 110 and the point of sale system 120. For example, the card reader 110 may receive a selection of a key to use for securing the transaction message. The card reader 110 may also provide the transaction data or the secure transaction message 112 to the point of sale system 120. This exchange is further described in the next figures.

Figure 3:
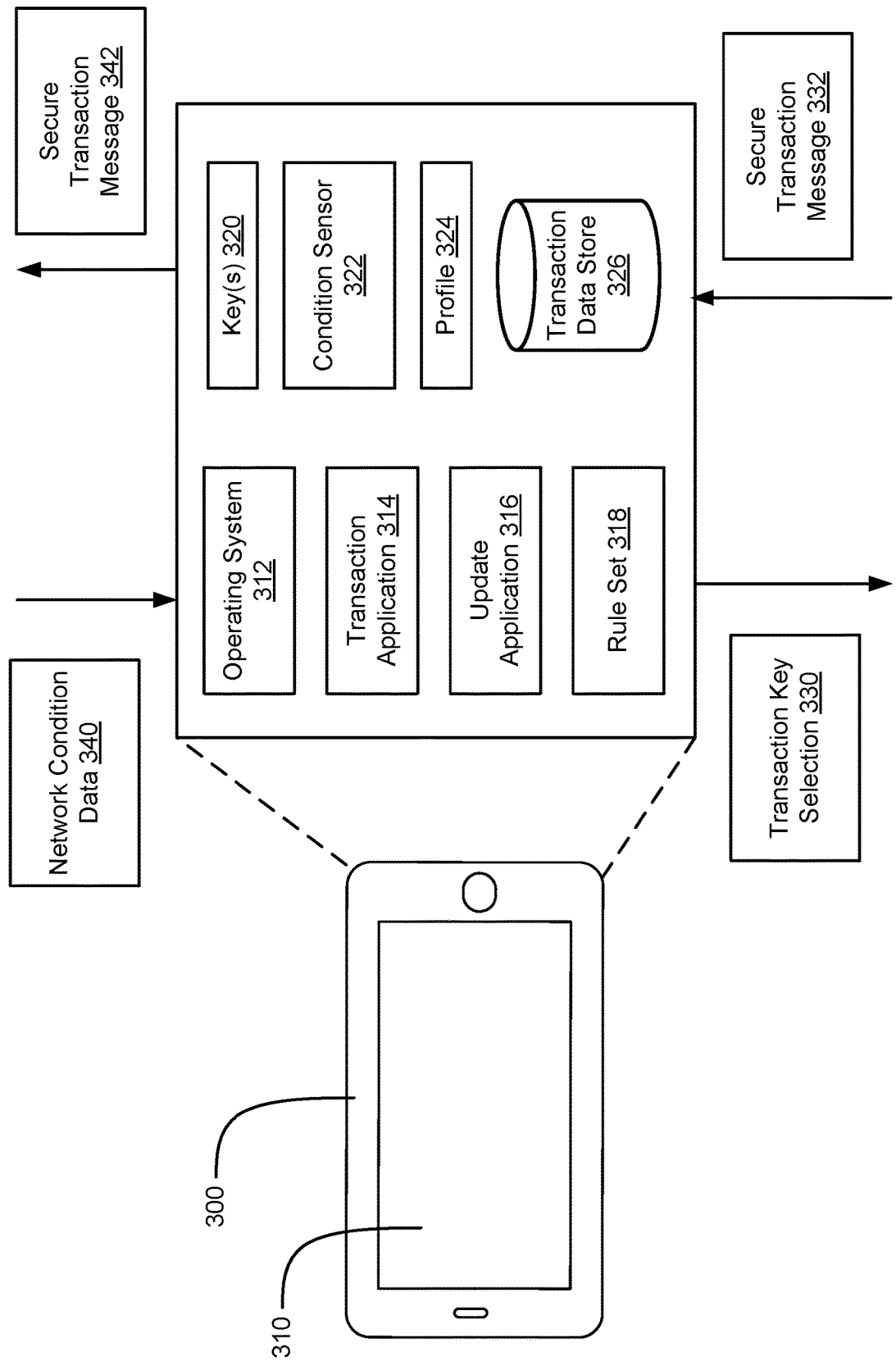
FIG. 3 illustrates an example of a configuration of a point of sale device, according to an embodiment of the present disclosure.

In an example, the point of sale system 120 may include one or more point of sale devices, each of which may be communicatively coupled with a card reader through an interface. A point of sale device may include a general purpose computer, such as a tablet computer or a smartphone, repurposed as a point of sale device or a special purpose computer designed as a point of sale device. Example configuration of a point of sale system 120 is illustrated in FIG. 3.

Generally, the point of sale system 120 may store a rule set that specifies a selection of a key from a plurality of keys for securing transaction messages. Copies of such keys may be stored at the card reader 110. Each of the keys may be unique to a key management system that belongs to one of the facilitator systems 130A-130K or to one of the processor systems 140A-140N. The key management system may be configured to manage and safeguard digital keys for authentication and cryptography. A hardware security module is an example of a key management system. Because of the one-to-one association between a key and a key management system, the rule set may equivalently specify a selection of one of the facilitator systems 130A-130K or one of the processor systems 140A-140N. The selection may be dynamic based on conditions.

More specifically, the rule set may specify a key selection (or, equivalently, a selection of a facilitator system or a processor system) based on a set of conditions. The conditions may be network, operator, and/or transaction based conditions. For instance, the rule set may specify a selection of the most secure, low latency, user-preferred, operator-preferred, and/or low transaction cost facilitator system or processor system.

Upon the generation of a secure transaction message 112 given a selected key, the point of sale system 120 may route this message 112 to the facilitator system or the processor system associated with the selected key. This routing may occur over an interface between the payment system 120 on one side and the facilitator systems 130A-130K and the processor systems 140A-140N on the other side. This interface may include one or more data networks, such a wide area communications network ("WAN"). The data network may include a public network, such as the Internet and/or a private network (e.g., an intranet or a virtual private network (VPN) over the Internet).

In an example, a facilitator system, such as the facilitator system 130A, may include a plurality of transaction networks, shown in FIG. 1 as transaction networks 132A-132M for facilitator system 130A. Each transaction network may provide a unique set of network computing nodes that form a network path for receiving and processing a secure transaction message 112. An example configuration of a transaction network is further illustrated in FIG. 4.

Generally, each transaction network may include a key management system. The key management system may be associated with a key for decrypting a secure transaction message 112. Once decrypted, transaction data may be generated from the secure transaction message 112 and provided to an appropriate processor system. The transaction data may be secured again with a key associated with the processor system and, once secured, provided thereto from the transaction network.

Although FIG. 1 illustrates multiple transaction networks, a facilitator system (e.g., the facilitator system 130K) may include a single transaction network. Importantly, a single facilitator (e.g., an entity, operator, or service provider of the facilitator system) may manage the facilitator system, whether including one or multiple transaction networks, to provide various transaction functionalities. For instance, the facilitator system may act as a processor system to process aspects of the transaction. In another illustration, the facilitator system may provide service-added functionalities to the processor system, such as fraud detection, intermediary payment processing, refund processing, transaction aggregation and batch processing, and other transaction-related services.

Furthermore, a single transaction network or a plurality of transaction networks of a same facilitator may be geographically distributed. The geographic distribution may be limited to borders of one country or may span multiple countries and may be subject to regulations of the country(ies).

In an example, a processor system, such as the processor system 140A, may be configured as a credit card payment processing system, an automated clearinghouse ("ACH"), or another type of system for providing a payment approval or guarantee for an end user. Generally, the processor system may include a plurality of computing nodes to process and complete an aspect of a transaction (e.g., to provide the payment approval or guarantee). One of the computing nodes may include a key management system associated with a key for decrypting a secure transaction message 112 received from the point of sale system 112 or secure transaction data received from a facilitator system. Another computing node may include an endpoint configured to receive the decrypted data and complete the aspect of the transaction according to the data (e.g., by transferring funds, updating records of the end user, etc.).

A plurality of processing systems may be operated by a same processor. For example, processor systems 140A and 140B may be operated by a first processor, while the processor system 140N may be operated by another processor. The processing systems of a same processor may be geographically distributed. In an example, the geographic distribution may be limited to borders of one country or may span multiple countries and may be subject to regulations of the country(ies).

Various network topologies are possible, where each topology may include one-to-one, one-to-many, many-to-one, and/or many-to-many network connections between the various components. In an example, one or more card readers may be connected to one or more point of sale systems. In turn, one or more point of sale systems may be connected to one or more facilitator systems and/or to one or more processor systems. Similarly, one or more facilitator systems may be connected to one or more processor systems. For instance, the card reader 110 may be connected to the point of sale system 120 which may be connected to the facilitator systems 130A-130K and directly to one or more processor systems (e.g., directly to the processor system 140N). In turn, the facilitator system 130A may be connected to a subset of the processor systems, such as to processor systems 140A and 140B. In comparison, the facilitator system 130K may be connected to another subset, such as to the processor systems 140B-140N. Further, each transaction network of the facilitator system 130A may be connected to the same or different processor system(s) of the subset. For instance, the transaction network 132A may be connected to processor system 140A, whereas the transaction network 132M may be connected to processor system 140B. Of course, these are merely illustrative network topologies. Other variations are possible based on one-to-one, one-to-many, many-to-one, or many-to-many network connections.

In one illustrative example, given a set of conditions, the point of sale system 120 may select that transaction messages should be routed to the transaction network 132M based on the rule set. Accordingly, the card reader 110 may be instructed to use a key associated with the key management system of that network 132M. Upon a swipe of a credit card, the credit card reader 110 may generate a transaction message that includes data read from the credit card and a transaction amount. The credit card may be guaranteed by the processor system 140N. The card reader 110 may also encrypt the transaction message based on the key and provide the resulting secure transaction message 112 to the point of sale system 120. In turn, the point of sale system 120 may pass the secure transaction message 112 to the transaction network 132M. The key management system may decrypt this message 112, retrieve transaction data (e.g., the credit card number and the transaction amount), and encrypt the transaction data with a public key of the processor system 140N. The secure transaction data is then routed to the processor system 140 for payment processing.

In another illustrative example, the point of sale system 120 may determine that the transaction network 132M is unavailable. Based on the rule set, a selection to route transactions directly to the processing systems may be made. Upon a swipe of a credit card, the card reader 110 may generate a transaction message that includes a token corresponding to the credit card and a transaction amount. The credit card may be guaranteed by the processor system 140B that includes a key management system. The card reader 110 may encrypt the transaction message based on a key associated with this hardware module. The point of sale system 120 may receive and pass the resulting secure transaction 112 to the processor system 140B.

In the interest of clarity of explanation, various embodiments are described herein in connection with a hardware security module. As described herein above, a hardware security module is an example of a key management system. Hence, the embodiments of the present disclosure are not limited to hardware security modules and, instead, similarly apply to other types of key management systems, including any module configured to manage and safeguard digital keys.

Figure 2:
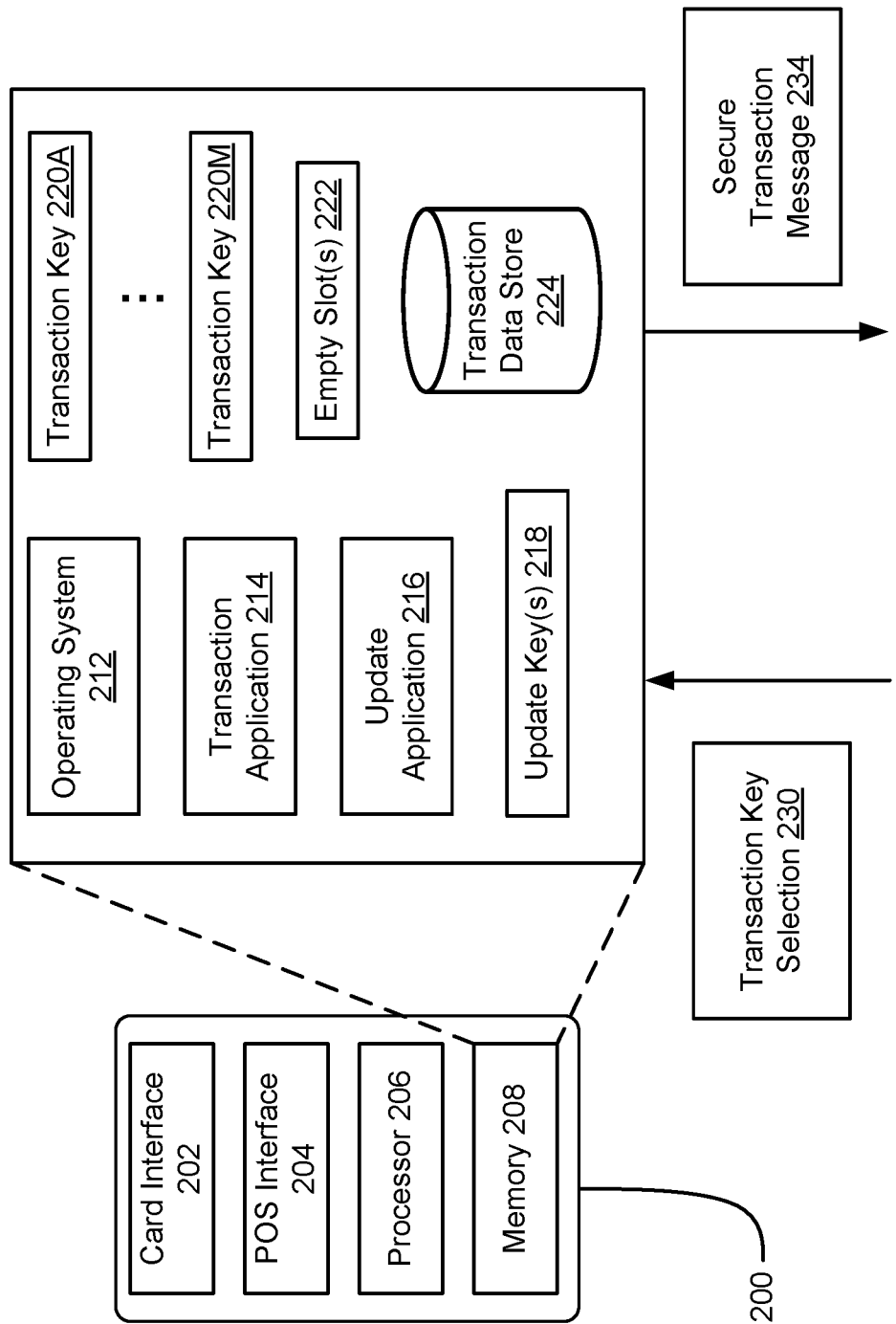
FIG. 2 illustrates an example of a configuration of a card reader, according to an embodiment of the present disclosure.

FIG. 2 illustrates an example of a configuration of a card reader 200. The card reader 200 may include a card interface 202, a point of sale interface 204, a processor 206, and a memory 208. In an example, the card interface 202 may be a contact-based or a wireless interface configured to read data from a user card and/or from a chip embedded in the user card. In comparison, the point of sale interface 204 may be a wired or a wireless interface configured to exchange data with a point of sale system (or a specific point of sale device of such a system). The processor 206 may be a microprocessor configured to execute computer-readable instructions stored at the memory 208. The execution of these instructions configure the card reader 200 to perform various operations, such as ones of an operating system 212, a transaction application 214, and an update application 216.

In addition to storing the computer-readable instructions of the operating system 212, transaction application 214, and update application 216, the memory 208 may also store one or more update key(s) 218 and a set of transactions keys 220A-220M. An update key may be an encryption key unique to a facilitator or a processor (e.g., a public key of a facilitator or processor that operates a transaction network) and may facilitate a secure update to certain computer-readable instructions and data stored in the memory 208.

In comparison, a transaction key may be an encryption key uniquely associated with a hardware security module. In an example, the encryption may be asymmetric. Accordingly, the transaction key may be a public key from a key pair, where the private key may be unique to the hardware security module. In another example, the encryption may be symmetric. The transaction key may be a shared secret key. In both examples, the card reader 200 may use the transaction key to encrypt a transaction message destined for decryption by the hardware security module. Hence, the different transaction keys 220A-220M may be uniquely associated with respective hardware security modules.

The memory 208 may also include one or more empty slots 222 and a transaction data store 224. An empty slot may be used to store new data, such as a new transaction key. The transaction data store 224 may store associations of tokens to user card data, such as in a database arrangement. In this case, upon reading particular user card data, the transaction data store 224 may be looked up to determine the respective token. If found, the token may be used in the transaction message in lieu of the read card data. Otherwise, the token may be received from a point of sale system and stored in the data store 224.

In an example, the transaction data store 224 may additionally or alternatively store or buffer transaction messages or data from such messages (e.g., the card data, transaction amount, etc.). This information may be secured based on the relevant transaction key(s) or based on other encryption keys (e.g., a private key of the card reader 200). In this example, storing or buffering the data may allow resending a transaction message in lieu of having to re-initiate and re-read the associated card. Further, the storage may allow to transmit the transaction messages in batches to the point of sale device. The timing and/or frequency of the transmission and the type and number of transaction messages to store and transmit may be set based on preferences of an operator of the point of sale device, an operator of a facilitator system, and/or an operator of a processor system. Such preferences may be stored in the transaction data store 224 or some other portion of the memory 208, or may be available to the card reader 200 from the point of sale device.

Some of the computer-readable instructions and data stored in the memory 208 may not be updatable. For example, the memory 208 may include mask read-only memory (ROM) or programmable ROM. The operating system 212, transaction application 214, update application 216, and update key(s) 218 may be stored in such portions of the memory 208.

Other computer-readable instructions and data stored in the memory 208 may be updatable. For example, the memory 208 may include a flash memory that defines updatable memory slots, including the empty slot(s) 222. The transaction keys 220A-220M, and the transaction data store 224 may be stored in such portions of the memory.

In operation, a transaction key selection 230 may be received from a point of sale system through the point of sale interface 204. This selection 230 may identify one of the transaction keys 220A-220M for securing transaction messages. The selection 230 may include, for example, an instruction to use a particular transaction key, to use a particular subset of the transaction keys 220A-220M, or to use all transaction keys 220-220M.

In an example of using multiple transaction keys, a first transaction key may be associated with a processor system and a second transaction key may be associated with a facilitator system. Both transaction keys may be selected to secure a transaction message. In this example, the card reader 200 may use the first transaction key to secure the transaction message (e.g., the underlying transaction data) to generate an encrypted blob. The card reader 200 may also use the second transaction key to further secure the encrypted blob in addition to metadata identifying the processor system and, optionally, operations applicable to the processing of the encrypted blob. This double encryption results in a secure transaction message having two layers of protection. The facilitator system may receive and decrypt the transaction message, thereby accessing the encrypted blob (but not the underlying transaction data, which remains secure based on the first transaction key) and the metadata (which may be decrypted based on a key corresponding to the second transaction key). Based on the metadata, the facilitator system may further process the encrypted blob (e.g., by aggregating this blob with a number of other encrypted blobs if the instructions specify so) and send the encrypted blob to the processor system. The processor system may in turn decrypt the encrypted blob with a key corresponding to the first transaction key and access the underlying transaction data.

In association with a transaction, the card reader 200 may read data of a user card through the card interface 202. The transaction application 214 may generate a transaction message from the read data. If a token is needed and is available, the transaction application 214 may retrieve this token from the transaction data store 224. Otherwise, the transaction message may include some or all of the read card data. Further, the transaction application 214 may encrypt the transaction message based on the selected transaction key, thereby generating a secure transaction message 234. This message 234 may be outputted to the point of sale system.

In an example, the encryption may follow a specific scheme, such as a derived unique key per transaction (DUKPT) scheme. The transaction key may be used as a base key. A one-time key may be derived from this base key and used for the encryption.

Over time, some or all of the transaction keys 220A-220M may be replaced or deactivated, or a set of new transaction keys may be added to the empty memory slot(s) 222. To do so, the update application 216 may be invoked. An instruction may be received from a point of system. As applicable, the instruction may identify an existing transaction key that should be replaced or deactivated. The same or another instruction may also include a new transaction key and/or identify an updatable memory slot. For added security, the new transaction key may be encrypted with a private key of a facilitator or a processor. Based on the instruction, the update application 216 may delete or deactivate the existing transaction key, decrypt the received key based on one of the update key(s) 218, and store the decrypted new transaction key in the applicable memory slot.

FIG. 3 illustrates an example of a configuration of a point of sale device 300. The point of sale device 300 may belong to a point of sale system that may, but need not, include other point of sale devices. Although not shown, the point of sale device 300 may generally include a processor, a memory, a point of sale interface for interfacing with one or more card readers, and a network interface for interfacing with one or more data networks.

As illustrated, the point of sale device 300 may include a user interface 310, an operation system 312, a transaction application 314, an update application 316, a rule set 318, a set of keys 320, a condition sensor 322, a profile 324, and a transaction data store 326. The operating system 312, transaction application 314, and/or update application 316 may drive the content and functionality of the user interface 310. Generally, the user interface 310 may allow a user to interact with the functionalities provided by these components.

In an example, the rule set 318 may specify a set of conditions and a selection of a transaction key (or, more generally, a subset of transaction keys from available transaction keys) depending on how these conditions may be met. For example, the rule set 318 may include conditional expressions (e.g., if-then-else expressions) that automate the selection. A selection of a transaction key may be equivalent to a selection of a transaction network, facilitator system, or processor system because of the one-to-one association between the transaction key and a corresponding hardware security module.

Various conditions are possible and may relate to network, operator, and/or transaction based conditions. The update application 316 may store these conditions and/or the rule set in memory of the point of sale device 300 or may have access thereto from a data store local to the point of sale system. In an example, the update application 316 may receive the rule set (or the conditions) from a remote system, such as from a facilitator system or a processor system. In another example, the update application 316 may receive the relevant definitions based on user input at the user interface 310.

The transaction application 314 may apply the rule set 318 based on a real-time monitoring of the defined conditions. The transaction application may accordingly generate a transaction key selection 330 (e.g., one that identifies a particular transaction key available at a card reader and that instructs the card reader to use this key). The transaction key selection 330 may be outputted to the card reader.

A secure transaction message 332 may be received from the card reader and may correspond to a transaction message secured based on the selected transaction key. The transaction application 314 may process this message 332 to generate a secure transaction message 342 for routing to the proper transaction network or processor system (e.g., the system associated with the selected transaction key).

Generally, the received secure transaction message 332 may include data read from a user card. Various types of processing are possible. In one example, the transaction application 314 may pass the secure transaction message 332 forward for output as the secure transaction message 342. This processing may include adding header information and, typically, may not change the content of the secure transaction message 332. In another example, the transaction application 314 may change the content. For instance, the card data may be replaced with a token. Specifically, the secure transaction message 332 may be decrypted with a proper key from one of the stored keys 320 (e.g., with an equivalent key of the transaction key, such as the same one in case of symmetric encryption). The card data may be retrieved and used to look up the transaction data store 326 for the token. Once the token is identified, the token along with other transaction data (e.g., the transaction amount) may be encrypted with the transaction key for forwarding to the proper system as the secure transaction message 342.

Similar to the data store 224 of FIG. 2, the transaction data store 326 may store associations of tokens to user card data (e.g., in a database arrangement). The keys 320 may include copies of the transaction keys stored at the card reader. The keys 320 may also include update keys (e.g., public keys of a facilitator or a processor). The transaction data store 326 may also store transaction messages or data from such messages.

In an example, updates to the tokens, keys 320, rule set 318, and or conditions defined in the rule set 318 may be pushed to the point of sale device 300. The update application 316 may receive the updates from a remote system or based on user input at the user interface 310. The update application 316 may accordingly update the rule set 318, the key(s) 320, and the transaction data store 326. In addition, if an update should be pushed to a card reader, the update application 316 may push such an update. For instance, if an existing transaction key should be replaced or deactivated, or a new one should be added, the update application 316 may generate an instruction to the card reader for doing so.

Turning to the condition sensor 322, this component may be configured to monitor whether the conditions specified in the rule set 318 are satisfied. The transaction application 314 may interface with the condition sensor 322 to apply the rule set 318 and dynamically select a transaction key.

Various conditions may be monitored including network, operator, and/or transaction based conditions. The condition sensor 322 may monitor some or all of these conditions in real-time. In an example, the conditions may be associated with weights. In this way, how the conditions are met may be weighted to generate a selection decision based on the weighted combination of the conditions.

Network-based conditions may include an availability (e.g., online or offline) of a transaction network (or, similarly, a facilitator system or processing system), a network latency of such a network, and/or a security status of a hardware security module belonging to the network. Generally, the condition sensor 322 may implement a message exchange mechanism to automatically or upon request receive data about these conditions (e.g., status data or condition data) from the transaction network (shown in FIG. 3 as the receipt of network condition data 340). In an example, the availability and latency may be determined based on a heartbeat mechanism. For instance, the condition sensor 322 may ping the different networks on a periodic basis. If a response is received, the transaction network may be available. The response time may indicate the latency. The security status may be received from a remote system of the network (e.g., one that publishes or provides such a status).

As another example, a high percentage of soft declines at a processor system may be monitored (e.g., greater than 5% per 30 minutes). The condition sensor 322 may also monitor the approval/decline rate at a processor system based on a response code therefrom. In either cases, the condition sensor 322 may flag the processor system as experiencing a problem, such that transaction messages may be routed to other systems until the problem condition has been resolved.

As yet another example, a load balancing condition may be monitored. In this example, the condition sensor 322 may monitor the amount of secure transaction messages sent to a transaction network. This monitoring may be used to distribute secure transaction messages evenly, randomly, or based on available capacity. For instance, the rule set 318 may specify that after one thousand transaction messages have been sent to one transaction network, another transaction network should be selected for the next one thousand transaction messages.

Operator-based conditions may include a preference of an operator of the point of sale device 300, such as a merchant, to use a certain transaction network (or, similarly, an operator or service provider of a facilitator system or a processing system). The preference may be stored in the profile 324. Another example of an operator-based condition may include the geographic location where the point of sale device 300 may be deployed. Different geographic locations may be subject to different legal regulations and/or contractual obligations. Certain regulations or obligations may dictate the use of a particular set of transaction networks. The profile 324 may store a table of usable transaction networks per location. The condition sensor 322 may include a location sensor (e.g., a GPS receiver) configured to determine the location of the point of sale device 300. This location may be provided to the transaction application 314 that may then look up the profile 324 and determine the usable transaction networks(s). Similarly, the network latency may vary depending on a geographic location. For instance, two different transaction networks may be available. One of these networks may be within a same geographic region where the point of sale device 300 is located. The other one may be more remote. Accordingly, the latency through the first transaction network may be smaller given the relative geographic locations.

Transaction-based conditions may relate to various attributes of a transaction, such as the amount, type of item, time of day, batch processing, and other attributes. The profile 324 may store parameters to measure and qualify these attributes. These parameters may include thresholds, item categories, time periods, and other parameters. For instance, if the amount exceeds a threshold amount, the transaction should be routed to a certain transaction network. If the amount is less than a same or a different threshold amount, the transaction may be subject to batch processing. Similarly, if an item falls within a certain item category (e.g., whether a physical product or digital media), a particular transaction network may be used. If a transaction occurs within a certain time period, that time period may be used for batch processing or for a network latency prediction. For instance, transactions occurring within business hours may be collected and batched processed at the end of the day. The latency of a transaction network may be predicted for various time periods within a day based on historical data.

In another example, the condition sensor 322 may monitor the business arrangement (e.g., contract terms) that the operator has with a facilitator or processor. Business agreement may also dictate that a minimum amount of transactions (on a monthly, quarterly, or other time period basis as specified in the agreement) should be sent to a particular endpoint. The condition sensor 322 may be configured to track these amounts.

In a further example, the condition sensor 322 may determine attributes of an end user of a current transaction. The attributes may be stored in the profile 324 and may include end user preferences for a particular transaction. For instance, the end user may set the preference (e.g., through the user interface 310) to "opt-out" of ATM Rails and use instead as a signature debit transaction. In another illustration, depending on an authentication of the end user (username and password, personal identification number, biometric information) and on a the level of confidence about the authentication, one or more keys may be selected.

In an example, environmental conditions may include ambient noise or signals received in the operational environment. For example, an operator of a public area that includes a number of point of sale device (e.g., of a farmers market, where each point of sale device may be operated by a different farmer) may transmit inaudible signals via a regional system (e.g., a public announcement system) to specify which facilitator or processor systems should be used (or at least given preference). In this way, the point of sale device 300 need not actively monitor conditions itself but may receive the selection from the regional system. Hence, the monitoring of the conditions may be offloaded to the regional system that informs all point of sale devices in the area about the facilitator or processor systems to use.

In addition to automating the key selection based on the rule set 318 and the monitored conditions, a manual key selection may be possible. For example, the transaction application 314 may present options at the user interface 310 for an operator to select a particular transaction network (or, similarly, a facilitator system or processor system).

In operation, the condition sensor 322 may monitor one or more of the conditions. For instance, the condition sensor 322 may determine that a particular hardware security module is no longer secure and may identify the relevant transaction network to the transaction application 314. In turn, the transaction application 314 may apply the rule set 318 to choose another transaction network. The transaction application 314 may then send a transaction key selection 330 instructing the card reader to switch to the transaction key of the other transaction network for securing transaction messages. Later, the point of sale device 300 may be relocated to a new location. The condition sensor 322 may identify this location. The transaction application 314 may then identify that a third transaction network should be used given the regulations of the new location and may instruct the card reader to switch to a third transaction key. Hence, the point of sale device 300 may be easily adaptable in real-time to adapt to changes that impact the process of securing transaction messages.

Over time, new transaction networks may be added. Relevant data of such networks, such as their respective transaction keys, may be provided to the computing device. The update application 316 may update the rule set 318 to specify the conditions for using these networks. The update application 316 may also send the new transaction keys to the card reader. Hence, the point of sale device 300 may also be easily updatable to network changes.

Referring back to FIGS. 2 and 3, the point of sale device 300 may instruct the card reader 200 to use a particular transaction key. In turn, the card reader 200 may secure a transaction message based on this key and the point of sale device 300 may receive the resulting secure transaction message. However, other approaches to the secure the transaction message may also be possible.

In an example, the point of sale device 300 may not send a key selection to the card reader 200. Instead, the card reader 200 may secure the transaction message based on the different transaction keys stored thereat, resulting in multiple secure transaction messages per transaction, each of which may be secured based on one of the keys (e.g. multiple copies of the same transaction messages, where each of the copies is secured based on a different transaction key). The point of sale device 300 may receive the different multiple secure transaction messages, along with identifies of the transaction key per message. The point of sale device 300 may then select one of these secure transaction messages for processing and forwarding. Under this approach, additional processing may be pushed to the card reader 200 because multiple encryptions need to occur. However, there are benefits to this approach. For instance, after the transaction message is secured and is destined to a particular transaction network, that network may become unavailable. The point of sale device 300 may switch to a second transaction network based on the rule set 318. Because the point of sale device 300 already has a secure transaction messages encrypted with a transaction key of the second transaction network, the point of sale device 300 may automatically forward this message onto the second transaction network. This avoids the need to re-initiate the transaction at the card reader 200 (e.g., the end user need not swipe the card again).

In yet another example, the point of sale device 300 may send a key selection of a subset of the transaction keys. In this approach, multiple transaction messages may be generated and secured for a same transaction, where each of these messages may be secured based on one of the transaction keys from the subset. Similarly to the previous example, by using multiple keys, the need to re-initiate the transaction at the card reader 200 may be avoided because multiple copies of the same transaction message may already be available, each secured with a different transaction key.

Figure 4:
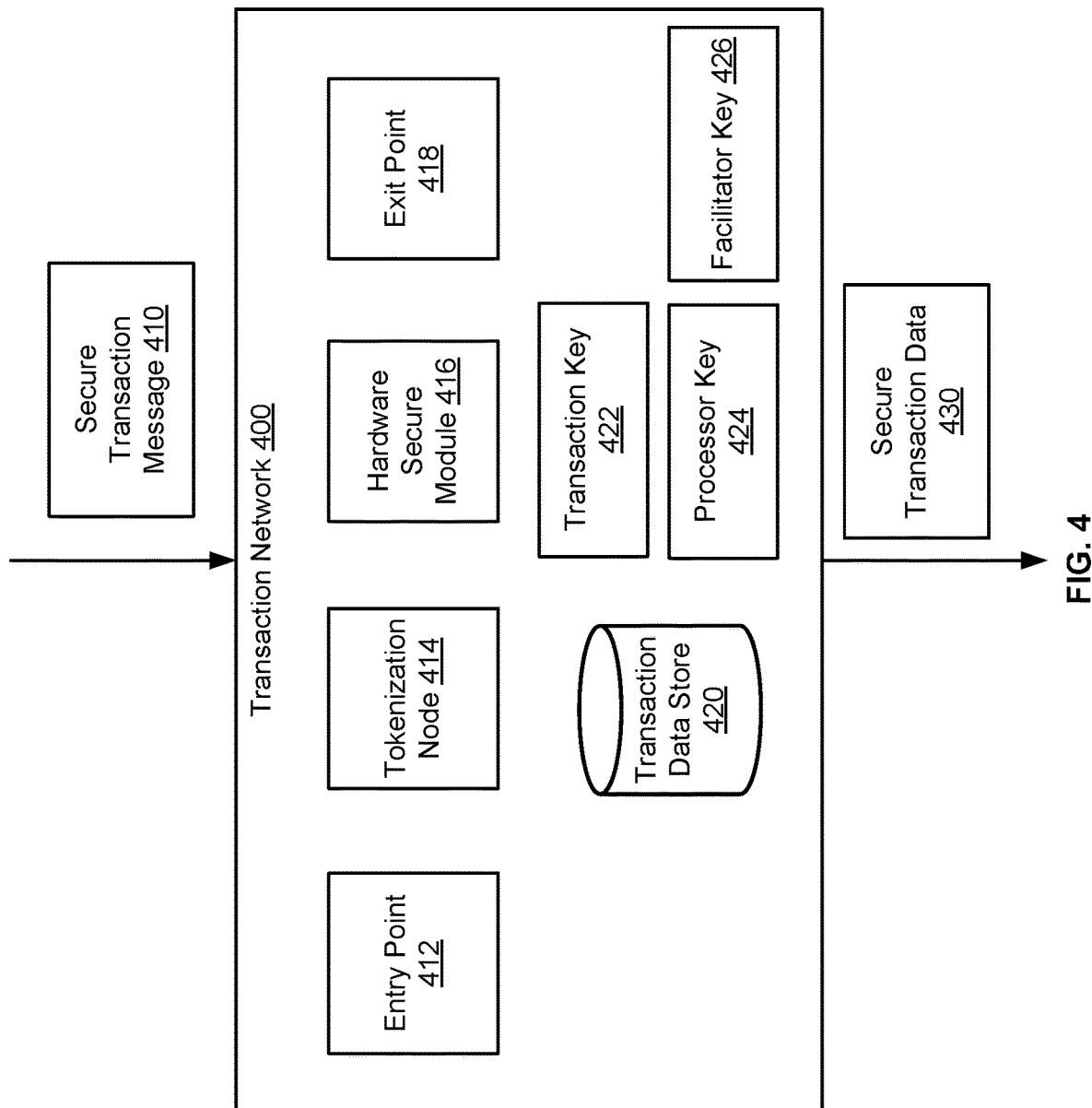
FIG. 4 illustrates an example of a configuration of a transaction network of a facilitator system, according to an embodiment of the present disclosure.

FIG. 4 illustrates an example of a configuration of a transaction network 400 of a facilitator system. Generally, the transaction network 400 may include multiple computing nodes. These computing nodes are secured via different software firewalls and physical barriers. In a way, the computing nodes may be installed within a secure virtual and physical zone that dictates special clearance for access. Collectively, the computing nodes may be configured to receive and process a secure transaction message 410 from a point of sale system, and to provide transaction-related services. These services may include authorizing the related transaction, detecting fraud, acting as an intermediary payment service, acting as an end point payment service, aggregating transactions, batch processing of transactions, and/or forwarding to an end point of a processor system. If forwarding is to occur, the transaction network 400 may output secure transaction data 430 to the processor system.

As illustrated, the transaction network 400 may include an entry point 412, a tokenization node 414, a hardware security module 416, and an exit point 418. The entry point 412 may represent a network gateway that may also provide register functionalities. The secure transaction message 410 may be addressed to an internet protocol (IP) address within the transaction network 400 and may be routed from the point of sale system to the entry point 412 based on the IP address. Similarly, the exit point 418 may represent a network gateway that may provide boundary functionalities. The secure transaction data 430 may be destined to an IP address of the processor system and may be routed accordingly from the transaction network 400 through the exit point 418.

The tokenization node 414 may be used to generate or provide tokens. In an example, the secure transaction message 410 may include card data read from a user card involved in the transaction. The tokenization node 414 may query a transaction data store 420 of the transaction network 400 for a token given the card data. If a token exists, the token may be used for handling aspect of the transaction (e.g., for processing a potential future refund, when the transaction is a payment transaction). Otherwise, the tokenization node 414 may generate the token, store the token in the transaction data store, and distribute the token to the point of sale system.

The hardware security module 416 may provide transaction-related (e.g., payments, electronic fund transfer, etc.) applications in a secure and mission-critical manner. For example, hardware security module 416 may be certified to internationally recognized standards such as Common Criteria or Federal Information Processing Standards (FIPS) 140 and relevant cryptographic algorithms and security protections. Generally, the hardware security module 416 may safeguard and manage keys for strong authentication and provide crypto-processing and may be implemented as a plug-in card or an external device that attaches directly to a computer or network server.

Symmetric and asymmetric cryptology may be supported depending on the application. The hardware secure module 416 may store and protect a transaction key 422 that is generally not-updatable. In symmetric cryptology, a card reader may store a copy of this key. In asymmetric cryptology, the transaction key 422 is a private encryption key and the card reader may store the corresponding public encryption key.

In addition, the hardware security module 416 may store a processor key 424, such as a public key of the processor system. The secure transaction data 430 outputted to this system may be encrypted based on the processor key 424 (e.g., the public key).

In an example, the transaction network may be part of a facilitator system. In this example, the hardware security module 416 may store a facilitator key 426 of the facilitator system. This key may be, for instance, a private key. Transaction keys and/or updates to the conditions and/or rule sets that should be distributed to the point of sale system and/or the card reader may be encrypted with the facilitator key 426 (e.g., the private key). The card reader and/or the point of sale system may use the corresponding public key for the decryption.

In operation, the secure transaction message 410 may be received through the entry point 412 and decrypted and processed through the hardware security module 416 to generate the secure transaction data 430. Any tokenization may occur through the tokenization node 414. The secure transaction data 430 may be routed to the processor system through the exit point 418.

FIGS. 5-9 illustrate example flows for generating and processing secure transaction messages. In the example flows, some of the operations may be embodied in, and fully or partially automated by, components executed by one or more processors hosted within a networked computer environment, similar to the one describes in FIG. 1. While the operations are illustrated in a particular order, it should be understood that no particular order is necessary and that one or more operations may be omitted, skipped, and/or reordered. In addition, some of the operations may be similar across the example flows. Such similarities are not repeated herein.

In the interest of clarity of explanation, the example flows are described in connection with a single card reader and a single point of sale system. However, the flows may similarly apply to a larger number of card readers and a larger number of point of sale systems. Generally, each card reader may be communicatively coupled to a point of sale device of a point of sale system. Each point of sale system may include one or more of the point of sale devices. A set of point of sale devices and a set of card readers may form a portion of a front-end system.

Further, the example flows are described in connection with a selection of a set of keys. However, the flows may similarly apply to a selection of a set of obfuscation processes. The selection of a key and the selection of an obfuscation process may be performed in conjunction, independently of each other, or in the alternative of each other. Generally, the obfuscation processes may be stored at a point of sale system (e.g., at a card reader). A management system of a transaction network may have knowledge of an obfuscation process (e.g., may store an equivalent process for reading and processing the obfuscated data). A rule set, similar to the rule set used for a key selection, may be applied to select one or more of the obfuscation processes. Instructions may be generated and provided to secure a set of transaction messages based on the selected obfuscation process(es). Transaction message(s) may be secured accordingly. When a management system receives a transaction message secured with a obfuscation process, the management system may reveal the secured data of this message based on the equivalent process.

Figure 5:
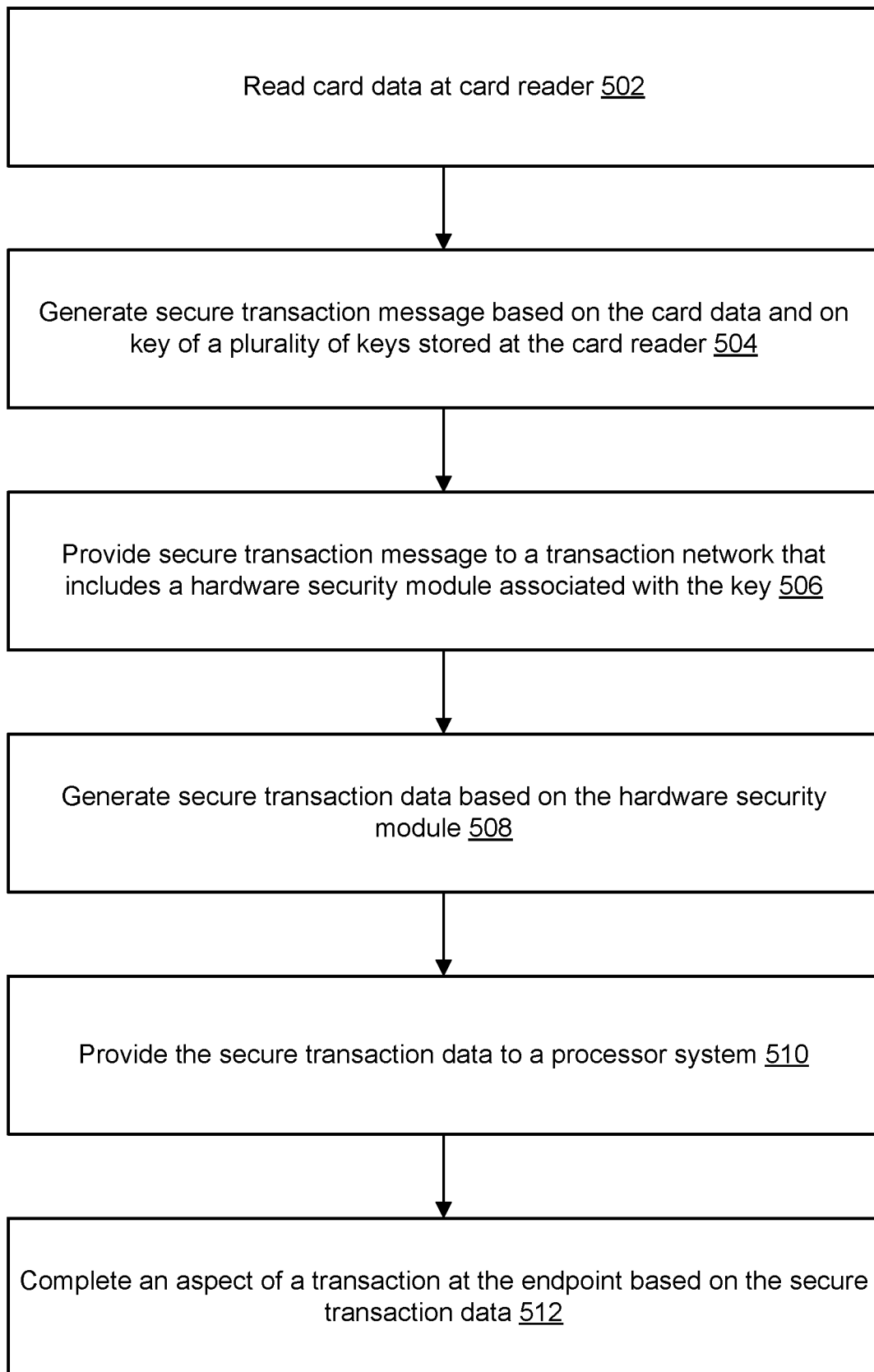
FIG. 5 illustrates an end-to-end example flow for generating and processing a transaction message related to a transaction, according to an embodiment of the present disclosure.

FIG. 5 illustrates an example end-to-end flow for generating and processing a transaction message related to a transaction. The example flow may start at operation 502, where card data may be read by a card reader. The transaction may be initiated based on a contact or a proximity between a user card and the card reader. The card reader may read data from the user card via a card interface.

At operation 504, the card reader may generate a secure transaction message based on the card data and based on a key of a plurality of keys stored at the card reader. In an example, the card reader may generate a transaction message that includes transaction data (e.g., fund amount to be charged) and card data (e.g., card number, expiration date, name on card, etc.). A token may also be used instead of the card data. The token may be retrieved from a local data store of the card reader. The card reader may secure the transaction message with the key. DUKPT encryption may be employed.

The plurality of keys may include transaction keys (e.g., symmetric encryption keys or asymmetric public encryption keys) and may be stored in updatable memory slots of the card reader. These may also include a public key of the point of sale system. The utilized key may have been selected based on an instruction from a point of sale system (e.g., from a point of sale device communicatively coupled with the card reader). Whether to use a transaction key associated with a hardware security module or the public key of the point of sale system may depend on a number of factors, including whether tokens should be used and the device responsible for inserting the token in the secure transaction message.

In one example, no token may be used or, alternatively, if one is to be used, the token may be inserted by the card reader. In this example, the key may be a transaction key uniquely associated with a particular hardware security module that belongs to a facilitator system or a processor system.

In another example, the token may be inserted by the point of sale system. In this case, the card reader may secure the transaction message based on the public key of the point of sale system. In turn, the point of sale system may decrypt the received messaged based on its private key, retrieve the token from a local data store based on the card data, replace the card data with the token in the transaction message, and encrypt the updated transaction message based on the transaction key associated with the particular hardware security module.

In both examples above, the secure transaction message ultimately outputted to a transaction network may be secured based on the transaction key associated with the particular hardware security module.

At operation 506, the secure transaction message may be provided to the transaction network. The transaction network may include the particular hardware security module. This network may be part of the facilitator system or the processor system. In an example, the card reader may provide the secure transaction message to the point of sale system, which may then route the secure transaction message to the transaction network.

At operation 508, secure transaction data may be generated based on the hardware security module. In an example, the hardware security module may receive and decrypt the secure transaction message based on a corresponding key stored at this module. The transaction data, card data, and/or token may be extracted and processed in support of a transaction service (e.g., authentication, fraud detection, intermediary payment, transaction aggregation, batch processing, electronic fund transfer, etc.). The processing may result in transaction data. The hardware security module may further encrypt the transaction data with a key of a processor system (e.g., a public key of this system).

At operation 510, the secure transaction data may be provided to the processor system. In an example, the hardware security module may belong to a facilitator system, rather than the processor system. In this case, the secure transaction data may be routed to the processor system through an exit point of the transaction network and over a data network. In another example, the hardware security module may belong to the processor system. In this example, the routing may be internal to this system.

At operation 512, an aspect of the transaction may be completed at an endpoint of the processor system. For example, the endpoint may receive and decrypt the secure transaction data based on a private key of the processor system. The endpoint may process the transaction data according to various transaction services (e.g., electronic transfer fund, user record updates, etc.).

Figure 6:
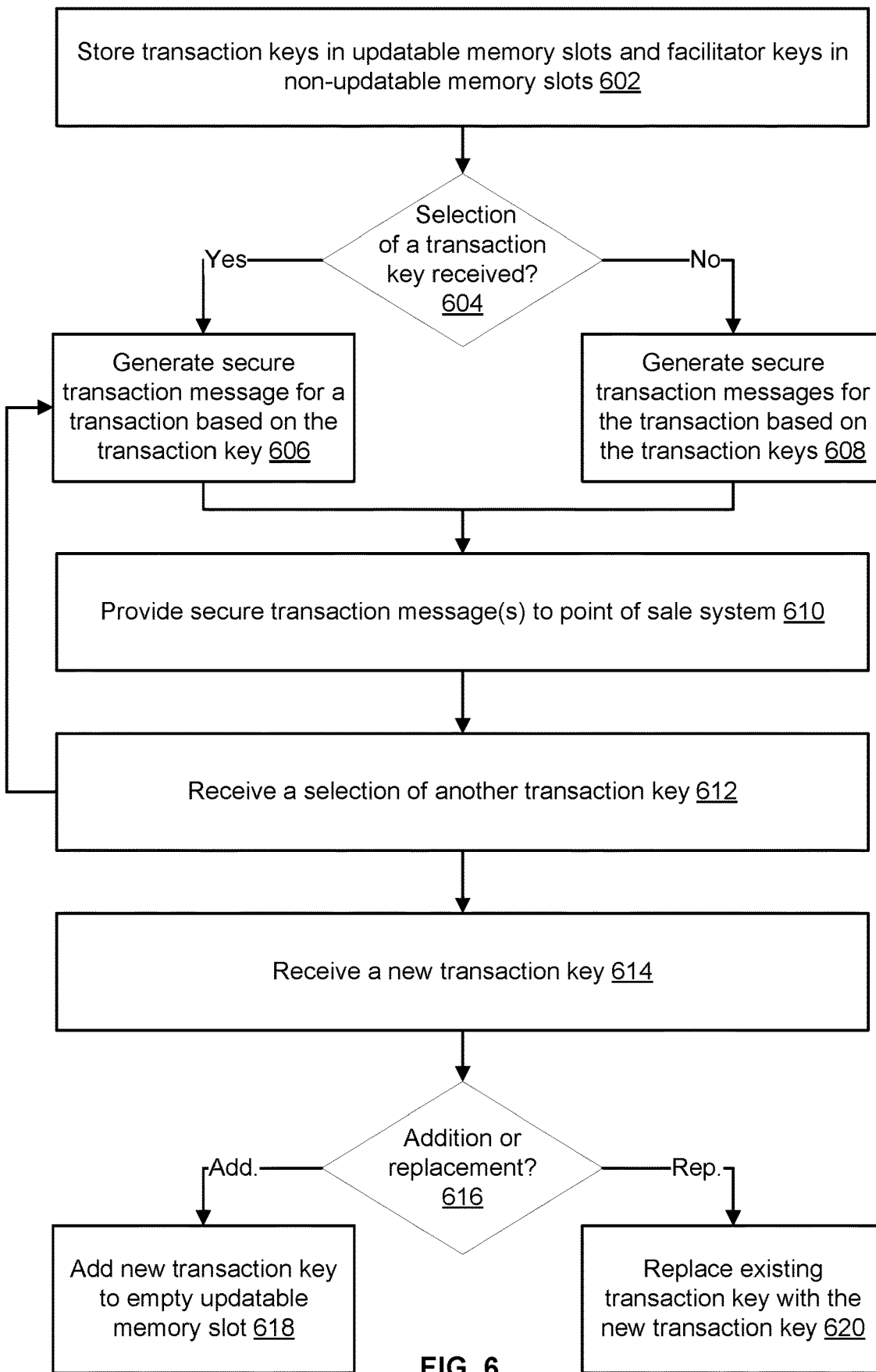
FIG. 6 illustrates an example flow for generating a secure transaction message at a card reader, according to an embodiment of the present disclosure.

FIG. 6 illustrates an example flow for generating a secure transaction message at a card reader. The example flow may start at operation 602, where the card reader may store transaction keys and facilitator keys. In an example, the transaction keys may be stored in updatable memory slots of the card reader, thereby supporting updates (e.g., replacements) to the keys. As such, the transaction keys may be loaded on the card reader at time of manufacturer and/or at various points in operation. In comparison, the facilitator keys may be stored in non-updatable memory slots, such as in a mask ROM or programmable ROM of the card reader. As such, the facilitator keys may be loaded on the card reader at time of manufacture. The transaction keys may be used to encrypt transaction messages. In comparison, the facilitator keys may be used to securely update the transaction messages.

At operation 604, a determination may be made as to whether a selection of a transaction key was received from a point of sale system (e.g., from a point of sale device communicatively coupled to the card reader). In an example, this determination may depend on an implementation strategy. One strategy may minimize processing. Accordingly, the card reader and the point of sale system may be configured such that a single secure transaction message may be exchanged between the two per transaction. Another strategy may increase processing, but may avoid the risk of potentially reading a user card multiple time for a single transaction. Accordingly, the card reader and the point of sale system may be configured such that the card reader generates multiple secure transaction message per transaction, where each is encrypted based on a different transaction key. Yet another strategy may be a hybrid of both, where the point of sale system may instruct the card reader to use a subset of the transaction keys (e.g., where the subset includes two or more transaction keys).

An implementation of the first strategy may include receiving, by the card reader from the point of sale system, the selection of a particular transaction key. Accordingly, operation 606 may be followed. An implementation of the second strategy may exclude receiving this selection or receiving a selection of multiple transaction keys. Accordingly, operation 608 may be followed.

At operation 606, the card reader may generate a secure transaction message for a transaction based on the particular transaction key. For instance, the card reader may read user card data, insert a token as applicable, and secure this message according to an encryption based on the transaction key.

At operation 608, the card reader made generate multiple secure transaction messages for the transaction based on the transaction keys stored at the card reader. For instance, the card reader may read user card data and insert a token as applicable to create a transaction message. The transaction message may be copied. Each copy may be secured according to an encryption based on one of the transaction keys, thereby resulting in multiple secure transaction messages. All the transaction keys may be used if no selection was previously received. Alternatively, the subset of the selected transaction keys may be used.

At operation 610, the card reader may provide the secure transaction message of operations 606 or the multiple secure transaction messages of operation 608 to the point of sale system. For instance, the secure transaction message(s) may be transmitted over a point of sale interface.

At operation 612, the card reader may receive a selection of another transaction key from the point of sale system. For instance, the point of sale system may dynamically determine that this other transaction key should be used based on a rule set and given monitored conditions. In an example, the card reader may receive an instruction that identifies the other transaction key. From that point on, new transaction messages may be secured based on the other transaction message until a new key selection is received, as illustrated with the loop back to operation 606.

At operation 614, the card reader may receive a new transaction key from the point of sale system. For added security, this new transaction key may be encrypted based on another key, such as one of the facilitator keys (or a private key of the point of sale system, in which case the card reader may store a corresponding public key). Generally, the new transaction key may be associated with a new hardware security module.

At operation 616, the card reader may determine whether the new transaction key should be added to an empty memory slot of the card reader or should replace an existing transaction key. For example, the new transaction key may be received from the point of sale system with an instruction for the addition or the replacement. In case of addition, operation 618 may be performed. Otherwise, operation 620 may be performed.

At operation 618, the card reader may add the new transaction key to an empty, updatable memory slot. In an example, the received key may already be encrypted for added security. The card reader may retrieve the relevant decryption key from its memory and may accordingly decrypt the received key to extract and store the transaction key.

At operation 620, the card reader may replace an existing key with the new transaction key. In an example, the instruction from the point of sale system may identify the existing key. The card reader may identify the memory slot storing the existing transaction key based on a local address table. Accordingly, the card reader may delete the existing transaction key and store in the memory slot the new transaction key.

Figure 7:
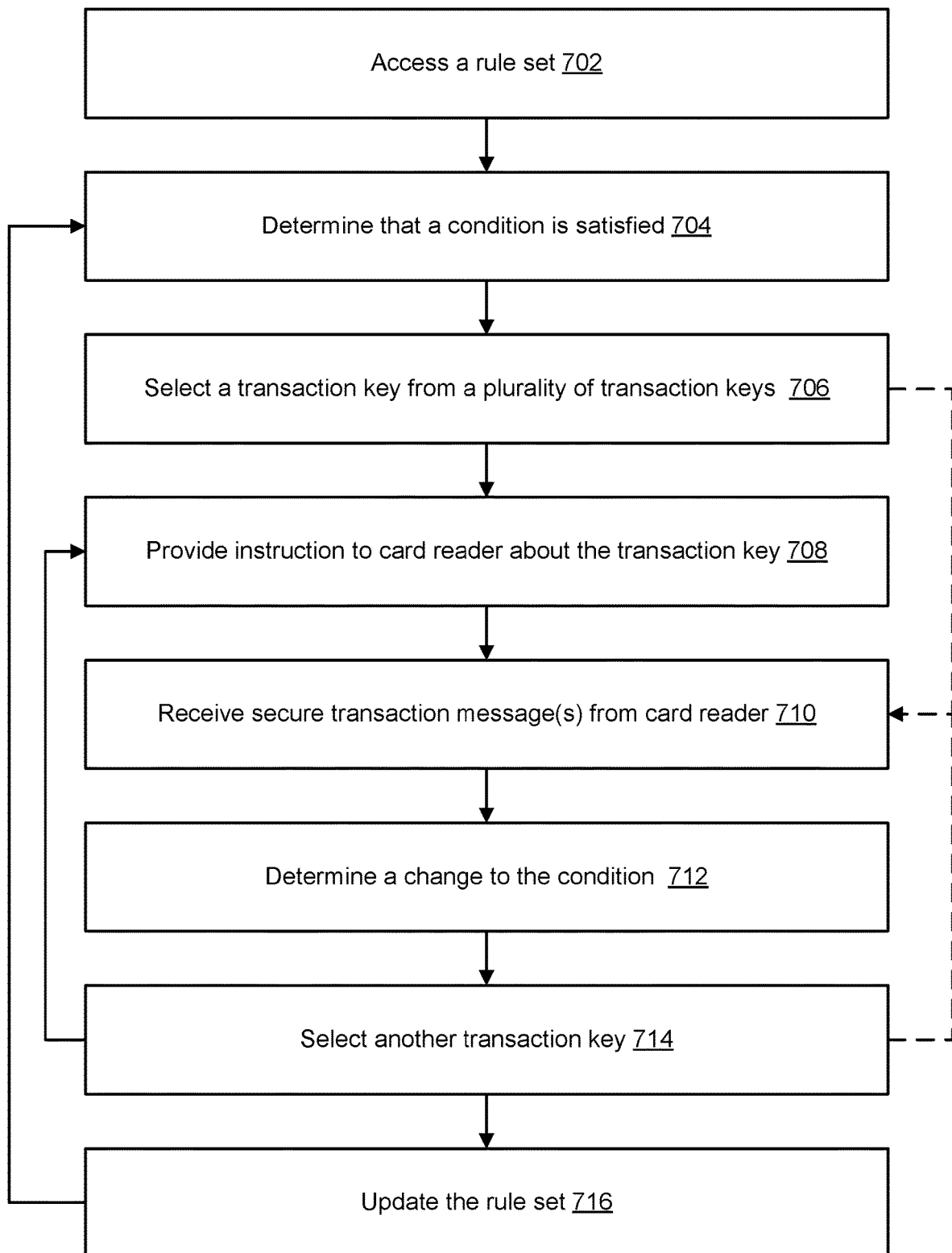
FIG. 7 illustrates an example flow for interfacing with a card reader, according to an embodiment of the present disclosure.

FIG. 7 illustrates an example flow for interfacing with a card reader. The example flow may start at operation 702, where a point of sale system (e.g., a point of sale device communicatively coupled with the card reader) may access a rule set. The rule set may be available from local memory or data store of the point of sale system and may specify conditions for selecting particular transaction keys depending on how the conditions are satisfied.

At operation 704, the point of sale system may determine that a condition from the rule set is satisfied. In an example, the conditions may be monitored in real-time, accessed from a profile, or attributes thereof inputted at a user interface of the point of sale system.

At operation 706, the point of sale system may select a transaction key (or, more generally a subset of one or more transaction keys) from a plurality of transaction keys based on the condition being satisfied. In an example, the rule set may specify the selection given that the condition is met.

At operation 708, the point of sale system may provide an instruction to the card reader about the transaction key (or, similarly, the subset). In an example, the point of sale system may identify the transaction key to the card reader. The point of sale system may also instruct the card reader to use the transaction key indefinitely until a new instruction is provided, for a certain time period, or for a certain number of transactions as defined in the rule set.

At operation 710, the point of sale system may receive one or more secure transaction messages per transaction from the card reader. In an example, a single secure transaction message is received per transaction. This message may be encrypted based on the selected transaction key. In another example, multiple secure transaction messages may be received per transaction. In this operation, the point of sale system may not have provided the selection of the transaction key to the card reader or may have instructed the card reader to use a subset of the available transaction keys. Instead, the point of sale system may select the relevant secure transaction message from the received ones. This is illustrated with the forward dashed line between operations 706 and 710. In both examples, if a token should be added to the relevant transaction secure message, the point of sale system may decrypt the secure transaction message (in which case, the transaction message may have been secured based on a public key of the point of sale system instead of the transaction key), add the token, and perform an encryption based on the transaction key.

At operation 712, the point of sale system may determine a change to the condition. This determination may be based on the real-time monitoring or input at the user interface. In an example, a change to any of the geographic location of the point of sale system (e.g., the point of sale device), the security status (e.g., whether compromised or not, a security level, etc.) of a hardware security module, transaction network, facilitator system, or processor system, the availability (whether online or offline) of such components, the latency of the transaction network (an increase to the latency or another transaction network becoming more responsive), the time of day, operator or user preferences, the load balancing, the number of exchange transaction messages, or any other monitored conditions may be detected.

At operation 714, the point of sale system may select another transaction key (or, more generally, another subset of the transaction keys). In an example, this selection may occur according to the rule set. Specifically, the point of sale system may determine how the conditions are met given the detected change and accordingly select the other transaction key. The point of sale system may inform the card reader about this selection, as illustrated with the loop back to operation 708. Alternatively, no indication of the selection may be provided to the card reader. Instead, the point of sale system may continue to receive multiple secure transaction messages per transaction and may select the relevant one, as illustrated with the loop back to operation 710.

At operation 716, the point of sale system may update the rule set. An update may be received from a remote system (e.g., the facilitator system or the processor system) or via the user interface. The update may change the conditions, identify new transaction networks, identify that an existing transaction network may have become obsolete, or provide other information that may impact the selection and/or usability of a transaction key. The point of sale system may store the update in the local memory or data store. Because the update may impact a transaction key selection, the point of sale system may determine whether certain specified conditions may be met or not, as illustrated with the loop back to operation 704.

Figure 8:
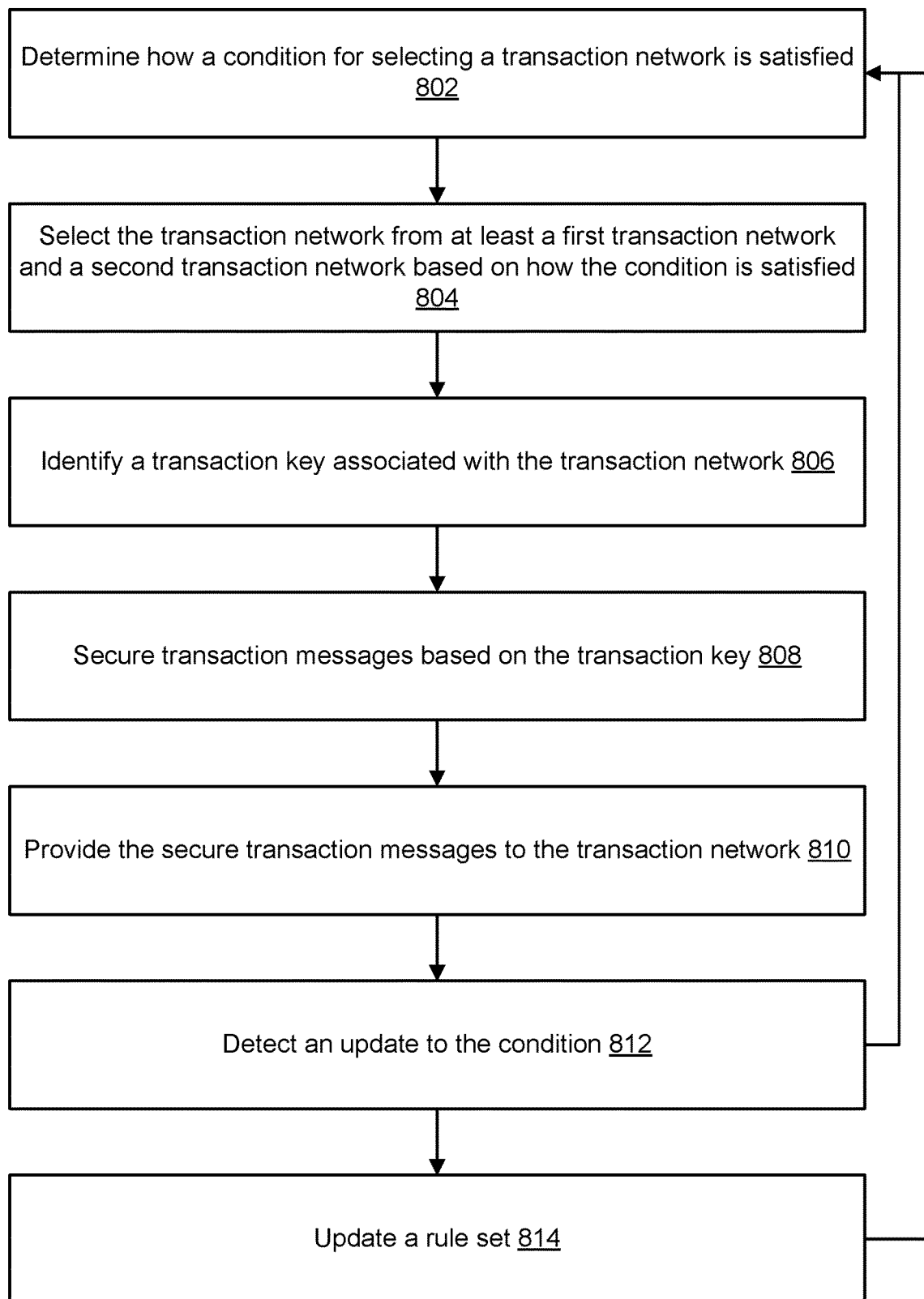
FIG. 8 illustrates an example flow for interfacing with transaction networks, according to an embodiment of the present disclosure.

FIG. 8 illustrates an example flow for interfacing with transaction networks. Each transaction network may belong to a facilitator system or a processor system. The various facilitator systems and processor systems may collectively represent a back-end system. The interface may be with a front-end system that includes a point of sale system and a card reader.

The example flow may start at operation 802, where the point of sale system may determine how a condition for selecting one of the transaction networks is satisfied. The condition may be specified in a rule set. The determination may be based on a real-time time monitoring of various conditions, attributes available from a profile, or attributes inputted at a user interface.

At operation 804, the point of sale system may select the transaction network from at least a first transaction network and a second transaction network based on how the condition is satisfied. For example, the rule set may specify the selection of the first transaction network if the condition is satisfied and, otherwise, the selection of the second selection network. To illustrate, the first transaction network may be the default selection. However, if it goes offline, the second transaction network may be automatically selected. In another illustration, the selection may be for the network that has the smaller network latency. In yet another illustration, the rule set may specify a selection based on the geographic location of the point of sale system (e.g., the point of sale device communicatively coupled with the card reader). If in a particular location, the first transaction network may be selected. Otherwise, the selection may be for the second transaction network. Similarly, the selection may be made based on the security status of the each of the two networks, time of day, and/or operator or user preferences.

At operation 806, the point of sale system may identify a transaction key associated with the selected transaction network. For example, the transaction network may include a hardware security module with which the transaction key may be associated. The point of sale system may maintain in local memory or data store associations (e.g., in a database arrangement) between identifiers of transaction networks and identifiers of the transaction keys. The transaction key may be identified from these associations given an identifier of the selected transaction network.

At operation 808, a transaction message may be secured based on the transaction key. In an example, the card reader may generate the transaction message and secure it based on the transaction key. In another example, the point of sale system may receive and process the transaction message and secure it based on the transaction key.

At operation 810, the point of sale system may provide the secure transaction message to the transaction network. For example, the secure transaction message may be sent over a private or public data network that communicatively couples the point of sale system and the transaction network.

At operation 812, the point of sale system may detect an update to the condition. The update may impact the selection of the transaction network. For example, if the first transaction network may have been previously selected and is now offline, the update to the condition may include an update to the availability status of this network (e.g., changing from online to offline). Accordingly, the point of sale system may re-assess how the conditions specified in the rule set are satisfied or not, as illustrated in the loop back to operation 802.

At operation 814, the point of sale system may determine an update to the rule set. The update may be received from the selected transaction network, from another transaction network, from a remote system, or via the user interface. The point of sale may update the rule set accordingly. This update may impact how the conditions may be met or not. Accordingly, the point sale system may re-assess the conditions, as illustrated in the loop back to operation 802.

Figure 9:
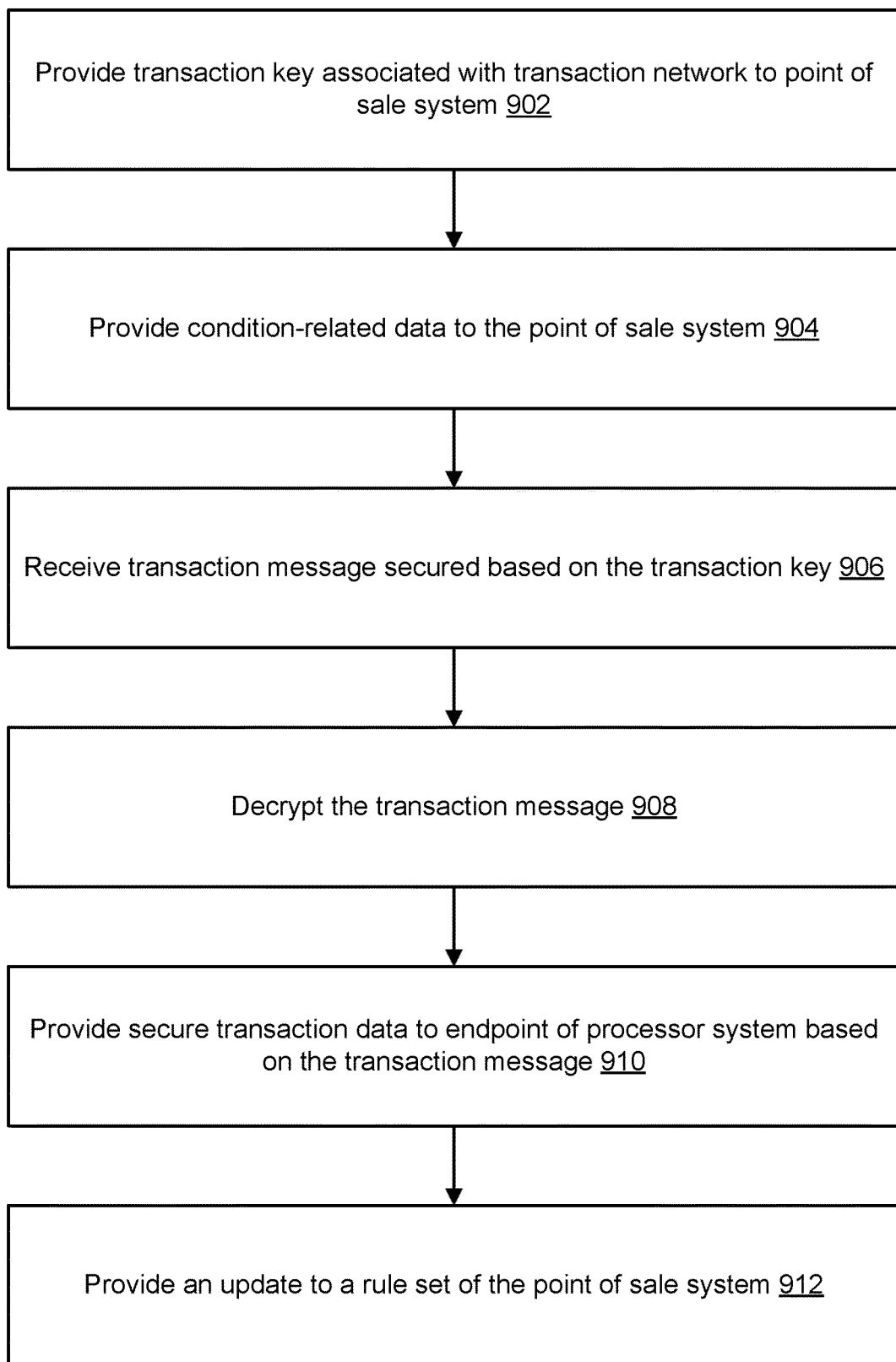
FIG. 9 illustrates an example flow for receiving and processing a secure transaction message within a transaction network, according to an embodiment of the present disclosure.

FIG. 9 illustrates an example flow for receiving and processing a secure transaction message within a transaction network. The transaction network may belong to a facilitator system or a processor system. The operations of the flow may be performed by one or more of the computing nodes of the transaction network.

The example flow may start at operation 902, where the transaction network may provide a transaction key associated therewith to a point of sale system. The transaction key may be uniquely associated with a hardware security module of the transaction network. For example, the transaction key may be a shared symmetric key or a public key of the hardware security module. The transaction key may be secured with an encryption based on a private key of the transaction network. The secured transaction key may be sent over a public or private data network to the point of sale system. The point of sale system, or a card reader communicatively coupled therewith, may accordingly receive this secured key, decrypt it with a corresponding public key, and access the transaction key.

At operation 904, the transaction network may provide condition-related data (e.g., status data) to the point of sale system. This data may relate to network-based conditions monitored by the point of system, may indicate the status of such conditions (e.g., whether met or not), and may be provided in a pull or push mechanism. For example, the transaction network may send over the data network status information about the security status (e.g., secure or compromised, a security level, whether a replacement hardware security module is planned for and the associated key, etc.) of the hardware security module, availability (e.g., online or offline), latency, load balancing, number of processed or under-processing transaction messages, or indicators of other network-related conditions.

At operation 906, the transaction network may receive a transaction message secured based on the transaction key. For example, the point of sale system may send the secure transaction message over the data network in response to a transaction initiated at the card reader.

At operation 908, the transaction network may decrypt the secure transaction message. For example, the relevant key (e.g., the symmetric key or the private key of the hardware security module) may be used to decrypt the secure transaction message and access the underlying transaction message itself.

At operation 910, the transaction network may provide secure transaction data to an end point of a processor system based on the transaction message. For example, the transaction message may be processed according to a transaction service (e.g., authentication, fraud detection, intermediary payment, transaction aggregation, batch processing, electronic fund transfer, etc.). The processing may result in transaction data. The hardware security module may further encrypt the transaction data with a key of the processor system (e.g., a public key thereof). The secure transaction data may be sent to the processor system over a public or private data network.

At operation 912, the transaction network may provide an update to a rule set of the point of sale system. The update may be encrypted with the private key of the transaction network and sent over the data network. The point of sale system may decrypt the update based on the relevant public key and modify the rule set as applicable.

Figure 10:
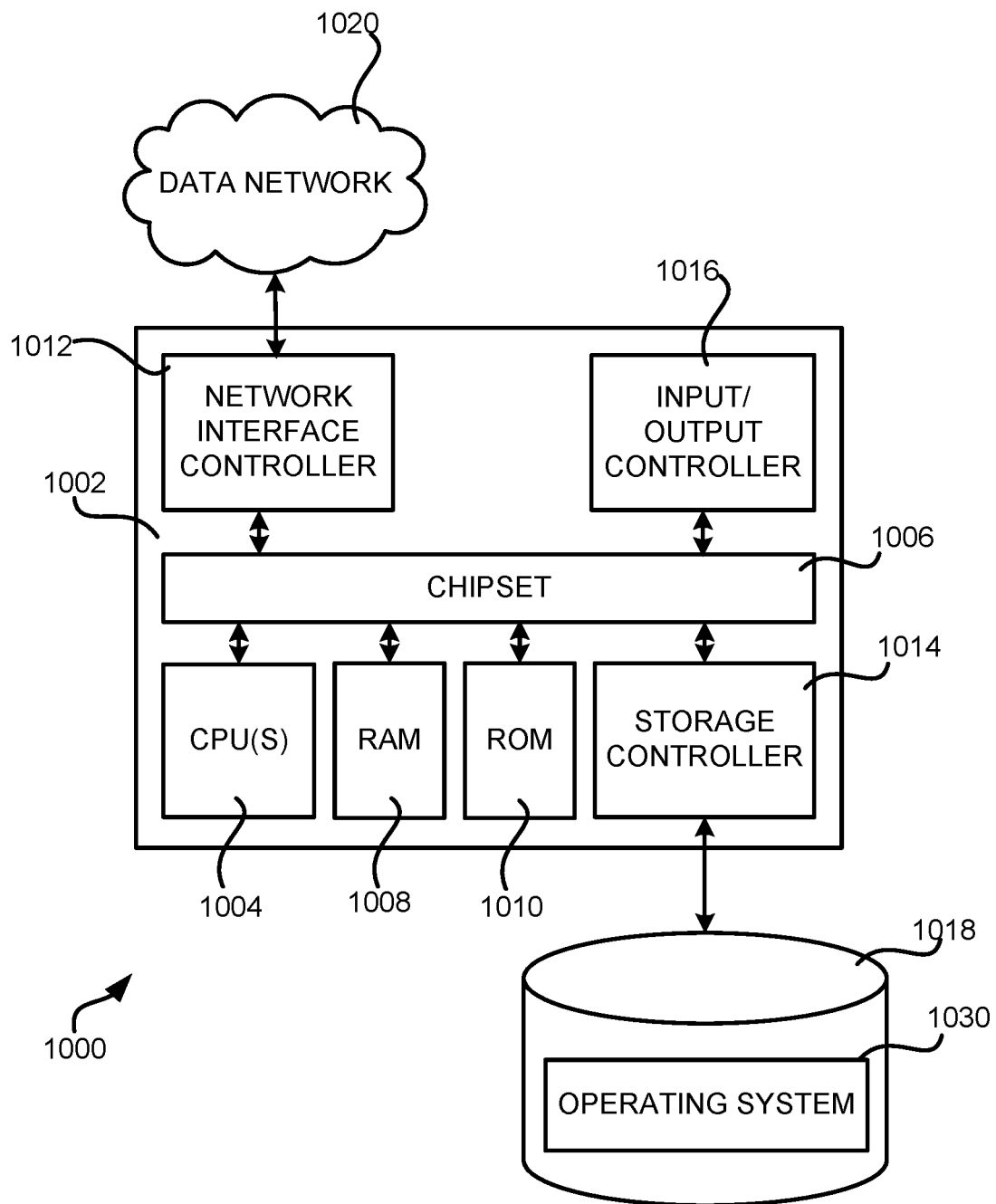
FIG. 10 illustrates a computer architecture diagram showing an example computer architecture, according to an embodiment of the present disclosure.

FIG. 10 illustrates a computer architecture diagram showing an example computer architecture. This architecture may be used to implement some or all of the systems described herein. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 1000 includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random access memory ("RAM") 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the embodiments described herein.

The computer 1000 may operate in a networked environment using logical connections to remote computing devices and computer systems through a network, such as the local area network 1020. The chipset 1006 may include functionality for providing network connectivity through a NIC 1012, such as a gigabit Ethernet adapter. The NIC 1012 is capable of connecting the computer 1000 to other computing devices over the network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules, and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1018 may store other system or application programs and data utilized by the computer 1000. The mass storage device 1018 might also store other programs and data not specifically identified herein.

In one embodiment, the mass storage device 1018 or other computer-readable storage media is encoded with computer-executable instructions which, when loaded into the computer 1000, transforms the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various routines described above. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10. It should also be appreciated that many computers, such as the computer 1000, might be utilized in combination to embody aspects of the various technologies disclosed herein.

Embodiments of the disclosure can be described in view of the following clauses:

Clause 1—a point of sale system comprising: one or more processors; and one or more computer-readable storage media comprising instructions that, upon execution by the one or more processors, configure the point of sale system to perform operations. The operations comprise accessing a rule set that specifies a selection of an encryption key from a plurality of encryption keys based at least in part on whether a condition associated with securing one or more transaction messages is satisfied, the plurality of encryption keys stored at a card reader, individual ones of the plurality of encryption keys associated with a different key management system. The operations also comprise determining that the condition is satisfied. The operations also comprise providing an instruction about the encryption key to the card reader based at least in part on the rule set and the condition being satisfied. The operations also comprise receiving, from the card reader based at least in part on the instruction, a secure transaction message, the secure transaction message secured based at least in part on the encryption key and associated with a transaction initiated at the card reader, the transaction subject to the condition associated with securing the one or more transaction messages. The operations also comprise providing the secure transaction message to a transaction system, the transaction system comprising a key management system associated with the encryption key.

Clause 2—a computer-implemented method operated within a system, the method comprising operations. The operations comprise accessing, by a point of sale system, a rule set that specifies a selection of at least one of: a key from a plurality of keys or an obfuscation process from a plurality of obfuscation processes, the selection based at least in part on a condition associated with securing one or more transaction messages, at least one of the plurality of keys or the plurality of obfuscation processes stored at a card reader. The operations also comprise providing, by the point of sale system, an instruction about the selection to the card reader based at least in part on the rule set and a determination that the condition is satisfied. The operations also comprise receiving, by the point of sale system from the card reader, a secure transaction message, the secure transaction message secured based at least in part on one or more of the key or the obfuscation process. The operations also comprise providing, by the point of sale system, the secure transaction message to a transaction system, the transaction system comprising a management system associated with at least one of the key or the obfuscation process.

Clause 3—One or more computer-readable storage media comprising instructions that, upon execution by one or more processors, configure a system to perform operations. The operations comprise accessing a rule set that specifies a selection of a key from a plurality of keys based at least in part on a condition associated with securing one or more transaction messages, the plurality of keys stored at a card reader. The operations also comprise selecting the key based at least in part on the rule set and a determination that the condition is satisfied. The operations also comprise generating a secure transaction message based at least in part on the key, the secure transaction associated with a transaction initiated at the card reader. The operations also comprise providing the secure transaction message to a transaction system, the transaction system comprising a key management system associated with the key.

Clause 4—The operations of clauses 1 to 3, wherein the key management system comprises a hardware security module, and wherein the instructions further configure the point of sale system to at least: determine that the condition associated with securing the one or more transaction messages is no longer satisfied; select, based at least in part on the rule set, a subset of encryption keys from the plurality of encryption keys stored at the card reader, the second subset excluding the encryption key and comprising a second encryption key associated with a second hardware security module that is different from the hardware security module of the transaction system; provide a second instruction about the subset of encryption keys to the card reader; and receive, from the card reader based at least in part on the second instruction, a second secure transaction message, the second secure transaction message encrypted based at least in part on the second encryption key and associated with a second transaction initiated at the card reader.

Clause 5—The operations of clause 4, wherein the instructions further configure the point of sale system to at least: provide, to the card reader, a third encryption key and a third instruction about replacing the encryption key with the third encryption key; determine that the condition associated with securing the one or more transaction messages is satisfied again; and provide, to the card reader based at least in part on the rule set and the third instruction, a fourth instruction about utilizing the third encryption key to secure subsequent transactions.

Clause 6—The operations of clauses 1 to 3, wherein the condition comprises at least one of: a security status of the key management system, a network availability of the transaction system, a network latency of the transaction system, a geographic location of the card reader, a geographic location of the point of sale system, or a preference from a profile of an operator of the point of sale system.

Clause 7—The operations of clause 2, wherein the key comprises an encryption key, and wherein the secure transaction message is encrypted based at least in part on the encryption key.

Clause 8—The operations of clause 2, wherein the management system comprises a key management system, wherein each of the plurality of keys is associated with a different key management system located within a transaction network, wherein the key is associated with a particular transaction network that comprises the key management system and that is operated by an operator, wherein another key of the plurality of keys is associated with a different transaction network that comprises a different key management system and that is operated by a different operator.

Clause 9—The operations of clauses 1 to 6, wherein the condition comprises a security status indicating whether a key of the key management system has been compromised or not.

Clause 10—The operations of clauses 1 to 6, wherein the condition comprises a latency of a network relative to a latency threshold, and wherein the network comprises the key management system.

Clause 11—The operations of clauses 1 to 6, wherein the condition is associated with a geographic location of one or more of: the card reader or the point of sale system, and wherein the geographic location is determined based at least in part on one or more of: a location sensor of the point of sale system or a user interface of the point of sale system.

Clause 12—The operations of clauses 1 to 6, wherein the condition comprises at least one of: a preference of an operator of the point of sale system, a preference of an operator of the transaction network, an offline batch processing of transactions, load balancing, or time of day.

Clause 13—The operations of clauses 1 to 3, wherein the rule set is stored in a data store local to the point of sale system, and the operations further comprising: updating the rule set in the data store based at least in part on a receipt of an update to the rule set; selecting a second key from the plurality of keys based at least in part on the update to the rule set; and providing a second instruction to the card reader to secure subsequent transaction messages with the second key instead of the first key.

Clause 14—The operations of clauses 1 to 3, wherein the system comprises the card reader, wherein the transaction message is secured by the card reader, wherein the card reader comprises a plurality of updatable memory slots that store the plurality of keys.

Clause 15—The operations of clause 14, wherein the card reader comprises a non-updatable memory slot that stores a public key of a provider of the key management system, wherein the plurality of updatable memory slots comprises an empty memory slot.

Clause 16—The operations of clauses 1 to 15, and wherein the operations further comprise:
receiving an encrypted key from a point of sale system; decrypting the encrypted key based at least in part on the public key of the provider to access a new key; and storing the new key in the empty memory slot.

Clause 17—The operations of clauses 1 to 15, wherein the system comprises the card reader and a point of sale system that stores the rule set, wherein the key is selected by the point of sale system, and wherein the transaction message is secured by the card reader.

Clause 18—The operations of clauses 1 to 15, wherein the system comprises the card reader and a point of sale system that stores the rule set, wherein the key is selected by the point of sale system, and wherein generating the secure transaction message comprises: receiving, by the point of sale system from the card reader, a plurality of secure transaction messages, each secure transaction message secured with a different one of the plurality of keys; and selecting a particular transaction message from the plurality of secure transaction messages based at least in part on the selection of the key.

Clause 19—The operations of clauses 1 to 15, wherein the secure transaction message comprises a token, wherein the system comprises the card reader and a point of sale system that stores the rule set, wherein the key is selected by the point of sale system, and wherein generating the secure transaction message comprises: selecting, by the card reader, a token from a data store local to the card reader, the token selected based at least in part on the transaction initiated at the card reader; securing, by the card reader, the token based at least in part on the key; and providing, by the card reader, the token to the point of sale system based at least in part on the token being secured.

Clause 20—The operations of clauses 1 to 15, wherein the system comprises the card reader and a point of sale system that stores the rule set, and wherein the operations further comprise:
generating a plurality of secure transaction messages associated with the transaction, each secure transaction messages secured based at least in part on a different key of the plurality of keys; storing the plurality of secure transaction messages at a data store local to the card reader; and sending the secure transaction message to the point of sale system based at least in part on the selecting of the key.

Clause 21—A transaction system configured comprising a plurality of transaction networks, each transaction network comprising a key management system. The plurality of transaction networks are communicatively coupled with at least a same endpoint and at least a same point of sale system. Key management systems of the plurality of transaction networks are associated with respective encryption keys stored at least at a card reader of the point of sale system. Based at least in part on a transaction initiated at the card reader, a key management system of the plurality of transaction networks is configured to perform operations. The operations comprise receiving a transaction message provided from the point of sale system. The transaction message is encrypted with an encryption key associated with the key management system. The transaction message is received based at least in part on a rule set stored at least at the point of sale system, the rule set specifying a selection of the encryption key from the encryption keys based at least in part on a condition associated with securing the transaction message. The operations further comprise decrypting the transaction message. The operations further comprise providing, transaction data to the endpoint based at least in part on the transaction message being decrypted.

Clause 22—A computer-implemented method operated within a system, the method comprising operations. The operations comprise receiving, at a transaction network, a transaction message provided from a point of sale system. The transaction message is secured based at least in part on one or more of: a key or an obfuscation process, the key and the obfuscation process associated with a management system of the transaction network. The transaction message is received based at least in part on a rule set. The rule set specifies a selection of at least: the key from a plurality of keys or the obfuscation process from a plurality of obfuscation processes. The selection is based at least in part on a condition associated with securing the transaction message. At least the plurality of keys or the plurality of obfuscation processes are stored at least at a card reader of the point of sale system. The operations also comprise accessing, by the management system, the transaction message based at least in part on one or more of the key or the obfuscation process. The operations also comprise providing, from the management system, transaction data to an endpoint based at least in part on the transaction message being accessed.

Clause 23—One or more computer-readable storage media comprising instructions that, upon execution by one or more processors, configure a transaction system that comprises a first transaction network and a second transaction network to perform operations. The operations comprise receiving, at the first transaction network, a transaction message provided from a point of sale system. The transaction message is encrypted with a first key associated with a first key management system of the first transaction network. The transaction message is received based at least in part on a rule set. the rule set specifies a selection of a key from at least the first key and a second key based at least in part on a condition associated with securing the transaction message. The second key is associated with a second key management system of the second transaction network. The first key and the second key are stored at least at a card reader of the point of sale system. The operations also comprise decrypting, by the first key management system, the transaction message. The operations also comprise providing, from the first key management system, transaction data to an endpoint based at least in part on the transaction message being decrypted.

Clause 24—the operations of clauses 21 to 23, wherein the key management system comprises a hardware security module, wherein a transaction network that comprises the hardware security module is configured to provide status data to the point of sale system, wherein the status data indicates whether the condition is satisfied, and wherein the rule set specifies the selection of the encryption key based at least in part on the condition being satisfied.

Clause 25—the operations of clauses 21 to 24, wherein a second hardware security module of a second transaction network is configured to receive a second transaction message, wherein the second transaction message is encrypted with a second encryption key associated with the second hardware module based at least in part on the rule set specifying a selection of the second encryption key, and wherein the selection of the second encryption key is based at least in part on the status data indicating that the condition is no longer satisfied.

Clause 26—the operations of clauses 21 to 23, wherein the condition comprises at least one of: a security status of the key management system, an availability of the transaction network, a latency of the transaction network, a geographic location of the card reader, or a preference from a profile of an operator of the point of sale system.

Clause 27—the operations of clause 22, wherein The computer-implemented method of claim 5, wherein the key comprises an encryption key, wherein the rule set is stored at the point of sale system, and wherein each one of the plurality of keys is associated with a different key management system that is included in one of a plurality of transaction networks.

Clause 28—the operations of clauses 22 or 27, further comprising providing, from the transaction network, status data to the point of sale system, and wherein the rule set specifies the selection of at least one of the key or the obfuscation process based at least in part on a determination that condition is satisfied given the status data.

Clause 29—the operations of clauses 21 to 23, wherein the condition is associated with a geographic location of one or more of: the card reader or the point of sale system, and wherein a geographic location of the transaction network satisfies the condition.

Clause 30—the operations of clauses 21 to 29, wherein the condition comprises a preference that indicates a selection of the transaction network over another available transaction based at least in part on a load balancing between the transaction network and the other transaction network.

Clause 31—the operations of clauses 21 to 30, wherein the condition comprises a preference of an operator of the point of sale system or of the transaction network, and wherein the preference is stored in a profile of the operator.

Clause 32—the operations of clauses 21 to 31, wherein the preference indicates a selection of the transaction network over another available transaction network based at least in part on a batch processing of transactions at the point of sale system or on a time of day.

Clause 33—the operations of clauses 21 to 23, further comprising providing, from the transaction network, an update to the rule set in the data store based at least in part on a receipt of an update to the rule set, wherein the update causes the point of sale system to select another key associated with another transaction network and to secure and send subsequent transaction messages to the other transaction network.

Clause 34—the operations of clause 23, wherein the operations further comprise based at least in part on the first transaction network being offline, receiving a second transaction message at the second transaction network from the point of sale system, the second transaction message encrypted with the second key and received based at least in part on the rule set indicating the selection of the second key given an offline status of the first transaction network.

Clause 35—the operations of clauses 23 or 34, wherein the operations further comprise receiving a second transaction message at the second transaction network from the point of sale system, the second transaction message encrypted with the second key and received based at least in part on the rule set indicating the selection of the second key given a greater latency of the first transaction network relative to the second transaction network.

Clause 36—the operations of clauses 23, 34, or 35, wherein the operations further comprise:
providing, from the first transaction network to the point of sale, an indication of a security compromise of at least the first key or the first key management system; and receiving a second transaction message at the second transaction network from the point of sale system, the second transaction message encrypted with the second key and received based at least in part on the rule set indicating the selection of the second key given the security compromise.

Clause 37—the operations of clause 36, wherein the operations further comprise: providing, from the first transaction network to the point of sale, data about at least one of: a replacement key management system or a new key associated with the replacement key management system; and receiving a third transaction message at the first transaction network from the point of sale system, the third transaction message encrypted with the new key and received based at least in part on the rule set indicating the selection of the new key given data.

Clause 38—the operations of clauses 23, 34, 35, 36, or 37, wherein the rule set specifies the selection of the first key based at least in part on the transaction message comprising card data read from a user card involved a transaction initiated at the card reader, and wherein the rule set specifies the selection of second key based at least in part the transaction message comprising a token associated with the user card.

Clause 39—the operations of clause 38, wherein the first key management system is configured to process the card data, and wherein the second key management system is configured to process the token.

Clause 40—the operations of clauses 23, 34, 35, 36, 37, 38, or 39, wherein the first transaction network and the second transaction network are associated with a same provider, and wherein the card reader stores a third key of a third transaction network associated with a different provider.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A point of sale system comprising:
   one or more processors; and
   one or more computer-readable storage media comprising instructions that, upon execution by the one or more processors, configure the point of sale system to at least:
      access a rule set that specifies a selection by the point of sale system of a first encryption key from a plurality of encryption keys based at least in part on a condition, the plurality of encryption keys stored at a card reader, individual ones of the plurality of encryption keys associated with a different key management system of a plurality of key management systems;
      select the first encryption key based at least in part on the condition, the first encryption key associated with a first key management system of the plurality of key management systems, the first key management system included in a transaction system;
      provide an instruction about the first encryption key to the card reader based at least in part on the selection of the first encryption key, the instruction indicating that the first encryption key is to be used by the card reader to secure a transaction initiated at the card reader;
      receive, from the card reader based at least in part on the instruction, a first secure transaction message, the first secure transaction message secured based at least in part on the first encryption key and associated with the transaction;
      decrypt the first secure transaction message to determine transaction data included in the first secure transaction message;
      encrypt, based at least in part on the first encryption key or a second encryption key associated with the transaction system, a portion of the transaction data to generate a second secure transaction message; and
      provide the second secure transaction message to the transaction system.

2. The point of sale system of claim 1, wherein the first key management system comprises a first hardware security module, and wherein the instructions further configure the point of sale system to at least:
   determine that the condition associated with securing one or more transaction messages is no longer satisfied;
   select, based at least in part on the rule set, a subset of encryption keys from the plurality of encryption keys stored at the card reader, the subset excluding the first encryption key and comprising the second encryption key associated with a second hardware security module that is different from the first hardware security module of the transaction system;
   provide a second instruction about the subset of encryption keys to the card reader; and
   receive, from the card reader based at least in part on the second instruction, a third secure transaction message, the third secure transaction message encrypted based at least in part on the second encryption key and associated with a second transaction initiated at the card reader.

3. The point of sale system of claim 2, wherein the instructions further configure the point of sale system to at least:
   provide, to the card reader, a third encryption key and a third instruction about replacing the first encryption key with the third encryption key;
   determine that the condition associated with securing the one or more transaction messages is satisfied again; and
   provide, to the card reader based at least in part on the rule set and the third instruction, a fourth instruction about utilizing the third encryption key to secure subsequent transactions.

4. The point of sale system of claim 1, wherein the condition comprises at least one of: a security status of the first key management system, a network availability of the transaction system, a network latency of the transaction system, a geographic location of the card reader, a geographic location of the point of sale system, or a preference from a profile of an operator of the point of sale system.

5. A computer-implemented method, comprising:
  accessing, by a point of sale system, a rule set that specifies a selection by the point of sale system of at least one of: a first key from a plurality of keys or a first obfuscation process from a plurality of obfuscation processes, the selection based at least in part on a condition, the first key or the first obfuscation process associated with a management system of a transaction system;
  selecting, by the point of sale system, the at least one of the first key or the first obfuscation process based at least in part on the condition;
  providing, by the point of sale system, an instruction about the selection to a card reader, the instruction indicating that the at least one of the first key or the first obfuscation process is to be used by the card reader to secure a transaction initiated at the card reader;
  receiving, by the point of sale system from the card reader, a first secure transaction message, the first secure transaction message secured based at least in part on the at least one of the first key or the first obfuscation process;
  extracting, by the point of sale system, transaction data from the first secure transaction message;
  securing, by the point of sale system, the transaction data to generate a second secure transaction message, the transaction data secured based at least in part on the first key, the first obfuscation process, a second key associated with the transaction system, or a second obfuscation process associated with the transaction system; and
  providing, by the point of sale system, the second secure transaction message to the transaction system.

6. The computer-implemented method of claim 5, wherein the first key comprises an encryption key, and wherein the first secure transaction message is encrypted based at least in part on the encryption key.

7. The computer-implemented method of claim 5, wherein the management system comprises a key management system, wherein each of the plurality of keys is associated with a different key management system located within a transaction network, wherein the first key is associated with a particular transaction network that comprises the key management system and that is operated by an operator, wherein another key of the plurality of keys is associated with a different transaction network that comprises a different key management system and that is operated by a different operator.

8. The computer-implemented method of claim 5, wherein the condition comprises a security status indicating whether the first key of the management system has been compromised or not.

9. The computer-implemented method of claim 5, wherein the condition comprises a latency of a network relative to a latency threshold, and wherein the network comprises the management system.

10. The computer-implemented method of claim 5, wherein the condition is associated with a geographic location of one or more of: the card reader or the point of sale system, and wherein the geographic location is determined based at least in part on one or more of: a location sensor of the point of sale system or a user interface of the point of sale system.

11. The computer-implemented method of claim 5, wherein the condition comprises at least one of: a preference of an operator of the point of sale system, a preference of an operator of the transaction system, an offline batch processing of transactions, load balancing, or time of day.

12. The computer-implemented method of claim 5, wherein the rule set is stored in a data store local to the point of sale system, and further comprising:
  updating the rule set in the data store based at least in part on a receipt of an update to the rule set;
  selecting a second key from the plurality of keys based at least in part on the update to the rule set; and
  providing a second instruction to the card reader to secure subsequent transaction messages with the second key instead of the first key.

13. One or more non-transitory computer-readable storage media comprising instructions that, upon execution by one or more processors, configure a system that comprises a point of sale system to perform operations comprising:
  accessing, by the point of sale system, a rule set that specifies a selection by the point of sale system of a first key from a plurality of keys based at least in part on a condition, the first key associated with a key management system of a transaction system;
  selecting, by the point of sale system, the first key based at least in part on the rule set and the condition;
  providing, by the point of sale system, an instruction about the selection to a card reader, the instruction indicating that the first key is to be used by the card reader to secure a transaction initiated at the card reader;
  receiving, by the point of sale system from the card reader, a first secure transaction message encrypted based at least in part on the first key and associated with a transaction initiated at the card reader;
  decrypting, by the point of sale system, the first secure transaction message to determine transaction data;
  generating, by the point of sale system, a second secure transaction message based at least in part on an encryption of a portion of the transaction data, the encryption based at least in part on the first key or a second key associated with the transaction system; and
  providing, by the point of sale system, the second secure transaction message to the transaction system.

14. The one or more non-transitory computer-readable storage media of claim 13, wherein the system comprises the card reader, wherein the card reader comprises a plurality of updatable memory slots that store the plurality of keys.

15. The one or more non-transitory computer-readable storage media of claim 14, wherein the card reader comprises a non-updatable memory slot that stores a public key of a provider of the key management system, wherein the plurality of updatable memory slots comprises an empty memory slot.

16. The one or more non-transitory computer-readable storage media of claim 15, and wherein the operations further comprise:
  receiving, by the card reader, an encrypted key from the point of sale system of the system;
  decrypting, by the card reader, the encrypted key based at least in part on the public key of the provider to access a new key; and
  storing, by the card reader, the new key in the empty memory slot.

17. The one or more non-transitory computer-readable storage media of claim 13, wherein the system comprises the card reader and the point of sale system that stores the rule set.

18. The one or more non-transitory computer-readable storage media of claim 13, wherein the system comprises the card reader and the point of sale system that stores the rule set, wherein the first key is selected by the point of sale system, and wherein generating the second secure transaction message comprises:

receiving, by the point of sale system from the card reader, a plurality of secure transaction messages, each secure transaction message secured with a different one of the plurality of keys; and selecting the second secure transaction message from the plurality of secure transaction messages based at least in part on the selection of the first key.

19. The one or more non-transitory computer-readable storage media of claim 13, wherein the second secure transaction message comprises a token, wherein the system comprises the card reader and the point of sale system that stores the rule set, wherein the first key is selected by the point of sale system, and wherein generating the second secure transaction message comprises:

selecting, by the card reader, a token from a data store local to the card reader, the token selected based at least in part on the transaction initiated at the card reader;

securing, by the card reader, the token based at least in part on the first key; and providing, by the card reader, the token to the point of sale system based at least in part on the token being secured.

20. The one or more non-transitory computer-readable storage media of claim 13, wherein the system comprises the card reader and the point of sale system that stores the rule set, and wherein the operations further comprise:

generating a plurality of secure transaction messages associated with the transaction, each secure transaction message secured based at least in part on a different key of the plurality of keys;

storing the plurality of secure transaction message at a data store local to the card reader; and sending the first secure transaction message to the point of sale system based at least in part on the selecting of the first key.

* * * * *